(12) United States Patent
Burckhardt et al.

(10) Patent No.: US 9,436,502 B2
(45) Date of Patent: Sep. 6, 2016

(54) EVENTUALLY CONSISTENT STORAGE AND TRANSACTIONS IN CLOUD BASED ENVIRONMENT

(75) Inventors: Sebastian Burckhardt, Sammamish, WA (US); Daniel Johannes Pieter Leijen, Bellevue, WA (US); Manuel A. Fahndrich, Seattle, WA (US); Benjamin Paul Wood, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 615 days.

(21) Appl. No.: 13/530,661

(22) Filed: Jun. 22, 2012

(65) Prior Publication Data

US 2012/0265742 A1 Oct. 18, 2012

Related U.S. Application Data

(63) Continuation-in-part of application No. 12/965,070, filed on Dec. 10, 2010, now Pat. No. 9,009,726.

(51) Int. Cl.
*G06F 9/46* (2006.01)
*G06F 17/30* (2006.01)

(52) U.S. Cl.
CPC ......... *G06F 9/466* (2013.01); *G06F 17/30371* (2013.01); *G06F 17/30575* (2013.01); *G06F 17/30212* (2013.01); *Y10S 707/99938* (2013.01); *Y10S 707/99954* (2013.01)

(58) Field of Classification Search
CPC .............. Y10S 707/99954; Y10S 707/99938
USPC .................. 718/104; 717/173; 714/E11.128; 709/203, 224; 707/E17.007, 999.021, 707/E17.005
See application file for complete search history.

(56) References Cited

U.S. PATENT DOCUMENTS

| 5,581,753 | A | * | 12/1996 | Terry et al. |
| 5,603,026 | A | | 2/1997 | Demers et al. |
| 5,857,182 | A | | 1/1999 | DeMichiel et al. |
| 6,240,414 | B1 | | 5/2001 | Beizer et al. |
| 7,136,903 | B1 | | 11/2006 | Phillips et al. |

(Continued)

OTHER PUBLICATIONS

Ghaffari, A. Z., U.S. Office Action, U.S. Appl. No. 12/965,070, Jan. 16, 2013, pp. 1-12.

(Continued)

*Primary Examiner* — Abu Ghaffari
(74) *Attorney, Agent, or Firm* — Alin Cori; Cassandra T. Swain; Micky Minhas

(57) ABSTRACT

An "Eventually Consistent Sharing Model" provides various techniques for using "revision diagrams" to determine both arbitration and visibility of changes or updates to shared data (e.g., data, databases, lists, etc.) without requiring a causally consistent partial order for visibility, and without requiring change or update timestamps for arbitration. In particular, the Eventually Consistent Sharing Model provides fork-join automata based on revision diagrams to track the forking and joining of data versions, thereby tracking updates made to replicas of that data by one or more sources. "Cloud types" are used to define a structure of the shared data that enables fully automatic conflict resolution when updating the shared data. These concepts enable mobile devices (or other computing devices that may periodically go "offline") to share structured data in cloud-based environments in a manner that provides local data replicas for offline operation while guaranteeing eventually consistent convergence of the data replicas.

20 Claims, 11 Drawing Sheets

(56) References Cited

U.S. PATENT DOCUMENTS

| | | | |
|---|---|---|---|
| 7,254,597 B2 | 8/2007 | Moir et al. | |
| 7,349,913 B2 | 3/2008 | Clark et al. | |
| 7,512,638 B2 | 3/2009 | Jhaveri et al. | |
| 7,529,780 B1 | 5/2009 | Braginsky et al. | |
| 7,593,943 B2 | 9/2009 | Clarke et al. | |
| 7,822,711 B1 | 10/2010 | Ranade | |
| 7,950,012 B2 | 5/2011 | Tirumalai et al. | |
| 7,979,844 B2 | 7/2011 | Srinivasan | |
| 8,195,858 B1 | 6/2012 | Keil et al. | |
| 8,396,840 B1* | 3/2013 | McHugh | G06F 3/0617 707/689 |
| 8,489,549 B2* | 7/2013 | Guarraci | 707/612 |
| 8,539,486 B2 | 9/2013 | Cain, III | |
| 2003/0149709 A1 | 8/2003 | Banks | |
| 2007/0180075 A1 | 8/2007 | Chasman et al. | |
| 2008/0077628 A1 | 3/2008 | Gonzalez et al. | |
| 2008/0183970 A1* | 7/2008 | Ros | G06F 12/084 711/141 |
| 2009/0125882 A1 | 5/2009 | Frigo et al. | |
| 2009/0150890 A1* | 6/2009 | Yourst | G06F 8/445 718/102 |
| 2010/0083266 A1 | 4/2010 | Dai et al. | |
| 2010/0162247 A1 | 6/2010 | Welc et al. | |
| 2011/0078123 A1* | 3/2011 | Busch | G06F 9/466 707/690 |
| 2011/0153566 A1 | 6/2011 | Larson et al. | |
| 2011/0269110 A1* | 11/2011 | McClellan | G06Q 10/06 434/353 |
| 2012/0096474 A1 | 4/2012 | Jiao | |
| 2012/0151495 A1 | 6/2012 | Burckhardt et al. | |

OTHER PUBLICATIONS

Yip, et al., "Pastwatch: a Distributed Version Control System", 3rd Symposium on Networked Systems Design & Implementation, NSDI '06, 2006, pp. 381-394.

Almeida, et al., "Version Stamps—Decentralized Version Vectors", 22nd International Conference on Distributed Computing Systems, 2002, pp. 8.

Abadi, et al., "Semantics of Transactional Memory and Automatic Mutual Exclusion", In Principles of Programming Languages (POPL), 2008, pp. 1-49.

Decandia, et al., "Dynamo: Amazon's Highly Available Key-Value Store", In Symposium on Operating Systems Principles, 2007, pp. 205-220.

Fekete, et al., "Making Snapshot Isolation Serializable", ACM Trans. Database System, vol. 30, No. 2, 2005, pp. 492-528.

Gilbert, et al., "Brewer's Conjecture and the Feasibility of Consistent, Available, Partition-Tolerant Web Services", SIGACT News, Jun. 2002, pp. 51-59.

Gray, et al., "The Dangers of Replication and a Solution", Sigmod Record, 1996, pp. 173-182.

Herlihy, et al., "Transactional Boosting: A Methodology for Highly-Concurrent Transactional Objects", In Principles and Practice of Parallel Programming (PPoPP), 2008, pp. 9.

Imine, et al., "Formal Design and Verification of Operational Transformation Algorithms for Copies Convergence", Theoretical Computer Science, 2006, pp. 167-183.

Koskinen, et al., "Coarse-Grained Transactions", In Principles of Programming Languages (POPL), 2010, pp. 12.

Petersen, et al., "Flexible Update Propagation for Weakly Consistent Replication", Operating Systems Review, 1997, pp. 288-301.

Saito, et al., "Optimistic Replication", ACM Computing Surveys, 2005, pp. 42-81.

Sun, et al., "Operational Transformation in Real-Time Group Editors: Issues, Algorithms, and Achievements", In Conference on Computer Supported Cooperative Work, 1998, pp. 59-68.

Kaplan, H., "Persistent data structures", In Handbook on Data Structures and Applications, CRC Press, 1995, pp. 1-27.

Shapiro, et al., "Eventual consistency", In Encyclopedia of Database Systems, 2009, pp. 1-2.

Shapiro, et al., "A comprehensive study of convergent and commutative replicated data types", Technical Report Rapport de recherche 7506, INRIA, 2011, pp. 50.

Tillmann, et al., "Touchdevelop: Programming cloud-connected mobile devices via touchscreen", In ONWARD '11 at SPLASH (also available as Microsoft TechReport MSR-TR-2011-49), 2011, pp. 1-21.

Chen, Peter Pin-Shan., "The entity-relationship model toward a unified view of data", ACM Trans. Database Syst., Mar. 1976, pp. 9-36.

Shapiro, et al., "Conflict-free replicated data types", In 13th Int. Symp. on Stabilization, Safety, and Security of Distributed Systems (SSS), Oct. 2011, pp. 1-17.

Terry, et al., "Managing update conflicts in bayou, a weakly connected replicated storage system", SIGOPS Oper. System, Dec. 1995, pp. 172-183.

Leiserson, Charles E., "The Cilk++ Concurrency Platform", Proceedings of the 46th Annual Design Automation Conference, Jul. 26-31, 2009, pp. 522-527.

Sen, Siddhartha., "Dynamic Processor Allocation for Adaptively Parallel Work-Stealing Jobs", Department of Electrical Engineering and Computer Science, Sep. 10, 2004, pp. 82.

Leiserson, Charles E., "Multithreaded Programming in Cilk", ACM Supercomputing Workshop on Manycore and Multicore Computing, Nov. 11, 2007, pp. 37.

Lea, Doug., "A Java Fork/Join Framework", Proceedings of the ACM 2000 conference on Java Grande, Jun. 3-4, 2000, pp. 8.

Mahajan, et al., "ASTRO: Autonomous and Trustworthy Data Sharing", Department of Computer Sciences (TR-08-24), Oct. 2008, pp. 15.

Aditya, et al., "Semantics of PH: A Parallel Dialect of Haskell", In Proceedings From the Haskell Workshop at FPCA, Publisher: Citeseer, Jun. 7, 1995, pp. 22.

Allen, et al., "Project Fortress: A Multicore Language for Multicore Processors", Sep. 2007, pp. 38-43.

Berenson, et al., "A Critique of ANSI SQL Isolation Levels", Joint ACM SIGMOD Intl Conference on Management of Data and ACM SIGACT—SIGMOD—SIGART Symposium on Principles of Database Systems, May 22-25, 1995, pp. 10.

Bergan, et al., "Coredet: A Compiler and Runtime System for Deterministic Multithreaded Execution", Proceedings of the fifteenth edition of ASPLOS on Architectural support for programming languages and operating systems, Mar. 13-17, 2010, pp. 12.

Berger, et al., "Grace: Safe Multithreaded Programming for C/C++", Proceeding of the 24th ACM SIGPLAN conference on Object oriented programming systems languages and applications, Oct. 25-29, 2009, pp. 16.

Blelloch, et al., "Implementation of a Portable Nested Data-parallel Language", Proceedings of the fourth ACM SIGPLAN symposium on Principles and practice of parallel programming, May 19-22, 1993, pp. 31.

Blundell, et al., "Deconstructing Transactions: The Subtleties of Atomicity", Appears in the Annual Workshop on Duplicating, Deconstructing, and Debunking (WDDD), Jun. 2005, pp. 1-7.

Bocchino Jr., et al., "A Type and Effect System for Deterministic Parallel Java", Proceeding of the 24th ACM SIGPLAN conference on Object oriented programming systems languages and applications, Oct. 25-29, 2009, pp. 20.

Danaher, et al., "The Jcilk Language for Multithreaded Computing", Synchronization and Concurrency in Object-Oriented Languages, Oct. 2005, pp. 8.

Devietti, et al., "DMP: Deterministic Shared-memory Multiprocessing", Proceeding of the 14th international conference on Architectural support for programming languages and operating systems, Mar. 7-11, 2009, pp. 12.

Flanagan, et al., "The Semantics of Future and its Use in Program Optimization", Proceedings of the 22nd ACM SIGPLAN—SIGACT symposium on Principles of programming languages, Jan. 23-25, 1995, pp. 12.

Frigo, et al., "Reducers and Other Cilk++ Hyperobjects", Proceedings of the twenty-first annual symposium on Parallelism in algorithms and architectures, Aug. 11-13, 2009, pp. 12.

(56) References Cited

OTHER PUBLICATIONS

Frigo, et al., "The Implementation of the Cilk-5 Multithreaded Language", Proceedings of the ACM SIGPLAN 1998 conference on Programming language design and implementation, Jun. 17-19, 1998, pp. 1-12.

Harris, et al., "Transactional Memory: An Overview", IEEE Micro, vol. 27, No. 3, May-Jun. 2007, pp. 22.

Weller, et al., "Beginning .NET Game Programming in C#", 2004, pp. 28.

Herlihy, et al., "Linearizability: A Correctness Condition for Concurrent Objects" ACM Transactions on Programming Languages and Systems, vol. 12 Issue 3, Jul. 1990, pp. 463-492.

Kulkarni, et al., "Optimistic Parallelism Requires Abstractions", Proceedings of the 2007 ACM SIGPLAN conference on Programming language design and implementation, Jun. 11-13, 2007, pp. 12.

Lee, et al., "Respec: efficient online multiprocessor replayvia speculation and external determinism", Proceedings of the fifteenth edition of ASPLOS on Architectural support for programming languages and operating systems, Mar. 13-17, 2010, pp. 13.

Lee, et al., "Featherweight X10: A Core Calculus for Async-finish Parallelism", Proceedings of the 15th ACM SIGPLAN symposium on Principles and practice of parallel programming, Jan. 9-14, 2010, pp. 23.

Leijen, et al., "The Design of a Task Parallel Library", Proceeding of the 24th ACM SIGPLAN conference on Object oriented programming systems languages and applications, Oct. 25-29, 2009, pp. 227-241.

"Microsoft. Parallel extensions to .NET", p. 1.

Moreau, Luc, "The Semantics of Scheme with Future", Technical Report M95/7, Proceedings of the first ACM SIGPLAN International Conference on Functional Programming, May 24-26, 1996, pp. 1-57.

Bernstein, et al., "Multiversion Concurrency Control—Theory and Algorithms", ACM Transactions on Database Systems, vol. 8, No. 4, Dec. 1983, pp. 465-483.

Bernstein, et al., "Concurrency Control and Recovery in Database Systems", Addison-Wesley, 1987, pp. 377.

Pratikakis, et al., "Transparent Proxies for Java Futures", Proceedings of the 19th annual ACM SIGPLAN conference on Object-oriented programming, systems, languages, and applications, Oct. 24-28, 2004, pp. 1-50.

Ghaffari, Abu Z., Final Office Action, U.S. Appl. No. 12/965,070, May 23, 2013, pp. 1-13.

Ghaffari, Abu Z., Office Action, U.S. Appl. No. 12/965,070, Mar. 27, 2014, pp. 1-13.

Randall, Keith H., "Cilk: Efficient Multithreaded Computing", Technical Report, Jun. 1998, pp. 179.

Riegel, et al., "Snapshot Isolation for Software Transactional Memory", In: Proceedings of the First ACM SIGPLAN Workshop on Languages, Compilers, and Hardware Support for Transactional Computing, 2006, pp. 10.

Rinard, et al., "Eliminating Synchronization Bottlenecks in Object-based Programs using Adaptive Replication", International Conference on Supercomputing, 1999, pp. 83-92.

Steele, Guy., "Parallel Programming and Parallel Abstractions in Fortress", Sun Micro systems Laboratories, Oct. 2006, pp. 57.

Welc, et al., "Safe Futures for Java", Proceedings of the 20th annual ACM SIGPLAN conference on Object-oriented programming, systems, languages, and applications, Oct. 16-20, 2005, pp. 439-453.

Welc, et al., "Irrevocable Transactions and their Applications", Proceedings of the twentieth annual symposium on Parallelism in algorithms and architectures, Jun. 14-16, 2008, pp. 285-296.

Denning, et al., "The Resurgence of Parallelism", Communications of the ACM, vol. 53, No. 6, Jun. 2010, pp. 3.

Lamport, Leslie., "How to Make a Multiprocessor Computer that Correctly Executes Multiprocess Programs", IEEE Transactions on Computers, vol. c-28, No. 9, Sep. 1979, pp. 690-691.

"Confluent Reductions: Abstract Properties and Applications in Term Rewriting Systems", 18th Annual Symposium on Foundations of Computer Science, Oct. 31, 1977-Nov. 2, 1977, pp. 30-45.

Saraswat, et al., "X10: concurrent programming for modern architectures", Proceedings of the 12th ACM SIGPLAN symposium on Principles and practice of parallel programming, Mar. 14-17, 2007, p. 271.

Ghaffari, A., U.S. Office Action, U.S. Appl. No. 12/965,070, Sep. 24, 2014, pp. 1-10.

Abu Ghaffari, Notice of Allowance, U.S. Appl. No. 12/965,070, Dec. 23, 2014, pp. 1-8.

* cited by examiner

Labeled Revision Diagram for Random Memory Access Example

Examples of Conflict Resolution for "CInt" (i.e., "Cloud Integer") with Updates of Revision Replayed at the Join Point

EVENTUALLY CONSISTENT STORAGE AND TRANSACTIONS IN CLOUD BASED ENVIRONMENT

CROSS-REFERENCE TO RELATED APPLICATIONS

This application is a Continuation-in-Part application of U.S. patent application Ser. No. 12/965,070, filed on Dec. 10, 2010, by Burckhardt, et al., and entitled "SHARING DATA AMONG CONCURRENT TASKS," and claims priority to U.S. patent application Ser. No. 12/965,070, under Title 35, U.S.C., §120.

BACKGROUND

1. Technical Field

An "Eventually Consistent Sharing Model" provides various techniques for using fork-join automata based on revision diagrams to track the forking and joining of updates or changes to versions of shared data thereby tracking updates made to replicas of the shared data, and using "cloud types" to define the structure of that data in such a way as to enable a fully automatic conflict resolution relative to the different updates.

2. Background Art

"Eventual consistency" is a well-known workaround to the fundamental problem of providing CAP (i.e., consistency, availability, and partition tolerance) to clients that perform queries and updates against shared data in a distributed system. It weakens traditional consistency guarantees (such as linearizability) in order to allow clients to perform updates against any replica of the shared data, at any time. Eventually consistent systems guarantee that all updates are eventually delivered to all replicas, and that they are applied in a consistent order.

Eventual consistency is popular with system builders. One reason is that it allows temporarily disconnected replicas to remain fully available to clients. This is particularly useful for implementing clients on mobile devices. Another reason is that it does not require updates to be immediately performed on all server replicas, thus improving scalability. In theoretical terms, the benefit of eventual consistency can be understood as its ability to delay consensus.

Existing techniques for providing eventual consistency generally use a weak consistency model that breaks with traditional approaches (e.g., serializable operations) and thus requires developers to be more careful. The issue is that updates are not immediately applied globally, thus the conditions under which they are applied are subject to change, which can easily break data invariants. Many eventually consistent systems address this issue by providing higher-level data types to programmers. However, the semantic details often remain sketchy. Experience has shown that ad-hoc approaches to the semantics and implementation of such systems can lead to surprising or unacceptable behaviors (e.g., an online "shopping cart" where deleted items reappear).

For example, eventual consistency uses a variety of techniques such as general causally-ordered broadcast or pairwise anti-entropy to propagate updates. These techniques are particular implementations that treat visibility as a partial order. As for arbitration order, it has been observed that two general approaches commonly used. The most common approach is to use (logical or actual) timestamps as a simple way to arbitrate events. Another approach (sometimes combined with timestamps) is to make updates commutative, which makes arbitration unnecessary (i.e., an arbitrary serialization of the visibility order can be selected for updates).

In addition, there is a large body of known work on "transactions." Most academic work in this area considers strong consistency (serializable transactions) only, and is thus not directly applicable to eventual consistency. Nevertheless there are some similarities. For example, one conventional technique provides insight on the limitations of serializable transactions, and proposes workarounds similar to those used by eventual consistency (timestamps and commutative updates). However, transactions remain tentative during disconnection with this technique. Another concept related to transactions considers "snapshot isolation" in relaxing its "consistency model," but transactions can still fail, and can not commit in the presence of network partitions. Yet another concept considers coarse-grained transactions, and uses abstract data types to facilitate concurrent transactions.

Prior work on "operational transformations" can be understood as a specialized form of eventual consistency where updates are applied to different replicas in different orders, but are themselves modified in such a way as to guarantee convergence. This specialized formulation can provide highly efficient broadcast-based real-time collaboration, but poses significant implementation challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

An "Eventually Consistent Sharing Model," as described herein, provides various techniques for using fork-join automata based on "revision diagrams" to determine both arbitration and visibility of changes or updates to shared information (e.g., data, databases, lists, etc.) without requiring a causally consistent partial order for visibility, and without requiring change or update timestamps for arbitration. In particular, the Eventually Consistent Sharing Model uses revision diagrams to track the forking and joining of data versions, thereby tracking updates made to replicas of that data by one or more sources. "Cloud types" are used to define a structure of the shared data that enables fully automatic conflict resolution when updating the shared data.

More specifically, the Eventually Consistent Sharing Model uses the concept of revision diagrams to provide eventually consistent transactions, by (1) keeping track of changes that are performed to each replica, and (2) ordering conflicting updates lazily, but consistently. In addition, the Eventually Consistent Sharing Model enables the use of cloud types (e.g., integers, strings, booleans, arrays, entities, etc., that are adapted to cloud computing environments) to declare the structure of data in such a way as to enable automatic conflict resolution. Further, the Eventually Consistent Sharing Model also enables mobile devices (or other computing devices that may periodically go "offline") to share structured data through the cloud or other network environments in a manner that provides local data replicas for offline operation while guaranteeing eventually consistent convergence of all corresponding data replicas using the automated conflict resolution techniques described herein. In other words, the Eventually Consistent Sharing Model provides various techniques for enabling a plurality of computing devices to use cloud-based shared storage in a way that supports offline operation while guaranteeing eventual consistency of all data replicas.

It should be noted that the use of the use of revision diagrams for sharing data among concurrent tasks is described in detail in co-pending U.S. patent application Ser. No. 12/965,070, filed on Dec. 10, 2010, by Burckhardt, et al., and entitled "SHARING DATA AMONG CONCURRENT TASKS," the subject matter of which is incorporated herein by this reference. In general, the co-pending U.S. patent application provides a fork-join model of concurrency wherein shared states, data, or variables are conceptually replicated on forks, and only copied or written if necessary, then deterministically merged on joins such that concurrent tasks or programs can work with independent local copies of the shared states, data, or variables in a manner that ensures automated conflict resolution.

The present document expands the use of revision diagrams relative to the co-pending U.S. patent application by providing various techniques for using fork-join automata based on revision diagrams to track the forking and joining of versions of shared data (i.e., local "replicas" or "revisions" of that data), thereby tracking updates made to replicas of that data, and using "cloud types" to define the structure of the data in such a way as to enable a fully automatic conflict resolution for guaranteeing eventual consistency of all data replicas.

In addition to the just described benefits, other advantages of the Eventually Consistent Sharing Model will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
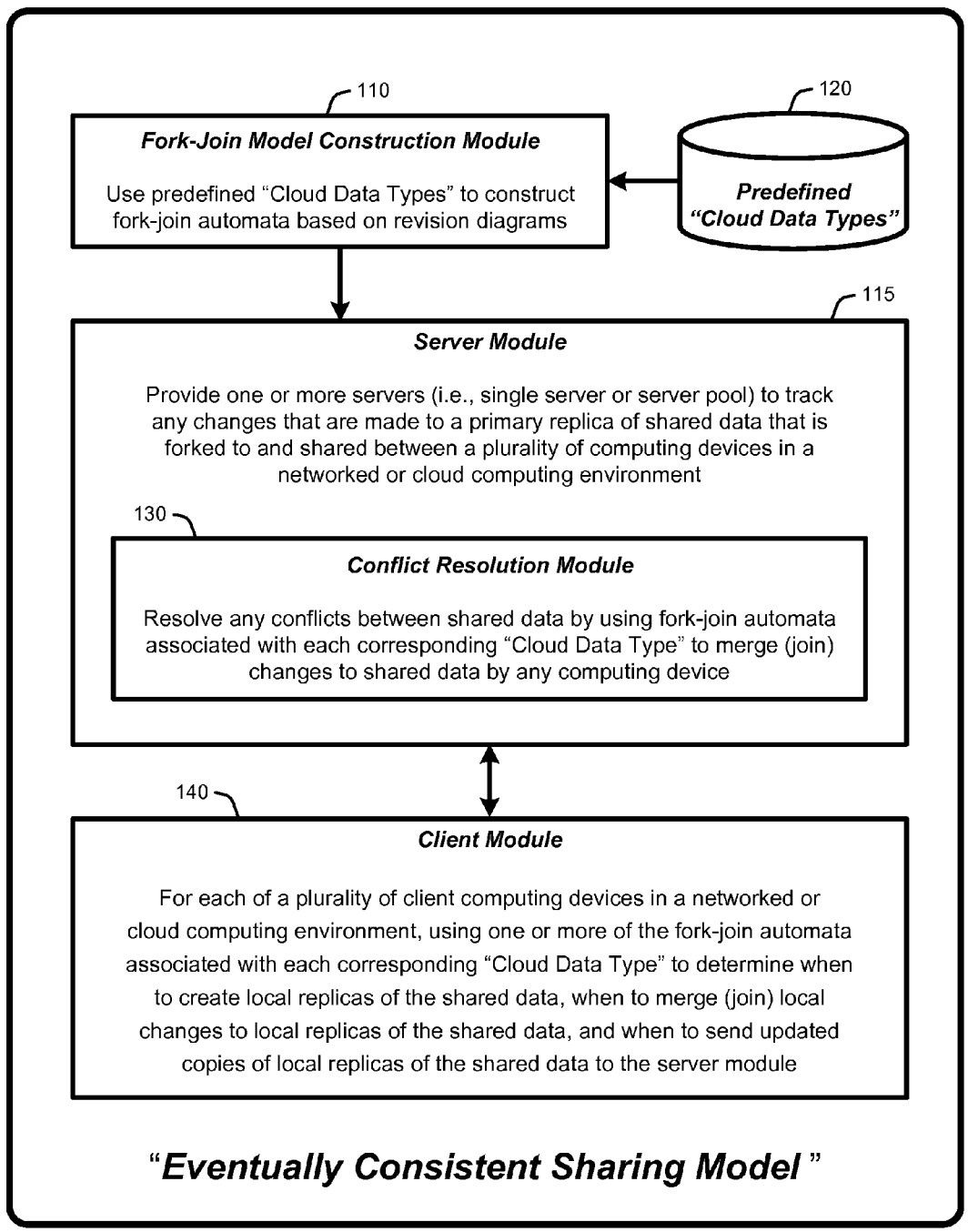
FIG. 1 provides an exemplary architectural flow diagram that illustrates program modules for implementing various embodiments of an "Eventually Consistent Sharing Model," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

Eventual consistency can improve the availability and performance of distributed shared storage in the presence of network partitions. However, it is often unclear how to deal with conflicting updates when considering eventual consistency data that has been changed or updated by multiple sources. Past systems have relied on manual conflict resolution or special-purpose code that treats data changes or updates as serializable transactions.

In contrast, an "Eventually Consistent Sharing Model," as described herein, provides various techniques for using fork-join automata based on "revision diagrams" to determine both arbitration and visibility of changes or updates to shared data (e.g., data, databases, lists, etc.) without requiring a causally consistent partial order for visibility, and without requiring change or update timestamps for arbitration. In particular, the Eventually Consistent Sharing Model uses revision diagrams (and fork-join automata based on these revision diagrams) to track the forking and joining of data versions, thereby tracking updates made to replicas of that data by one or more sources. "Cloud types" are used to define a structure of the shared data that enables fully automatic conflict resolution when updating the shared data. These concepts enable mobile devices (or other computing devices that may periodically go "offline") to share structured data in cloud-based or other network environments in a manner that provides local data replicas for offline operation while guaranteeing eventually consistent convergence of the data replicas.

More specifically, the Eventually Consistent Sharing Model introduces a notion of eventually consistent transactions based on a concise and abstract definition of this concept. This definition is leveraged to provide a systematic approach for building systems that support such transactions, based on revision diagrams. As discussed in detail herein, the revision diagram rules are provably sufficient to guarantee eventual consistency of replicas of shared data.

These concepts are then further expanded by using "composable data types" for eventual consistency. In particular, the concept of providing good programming abstractions for cloud storage, synchronization, and disconnected operation is central to the idea of enabling the use of programming abstractions and corresponding applications on devices having access to shared data. As described in detail herein, the use of composable data types by the Eventually Consistent Sharing Model provides a sound foundation upon which to build such programming abstractions using automatically synchronized cloud data types that can be composed into a larger data schema using indexed arrays and entities.

The techniques described herein enable implementing all the difficult parts of such a system (e.g., cloud service, local persistence, caching, conflict resolution, synchronization, etc.), while guaranteeing eventual consistency. As such, an application programmer declares only the data schemas and focuses on writing code performing operations on the data, as well as identifying points in his program where synchronization is desired. The Eventually Consistent Sharing Model then ensures that such synchronization is automatically performed at the identified points.

In general, the use of revision diagrams and fork-join automata enable the Eventually Consistent Sharing Model to achieve eventual consistency by using a data model that directly integrates support for eventually consistent off-line operation with persistent shared structured data into any desired programming language. The corresponding data schema can be composed from basic "cloud types" (e.g., integers, strings, booleans, arrays, entities, etc., that are adapted to cloud computing environments) which eliminates the need for user-defined conflict resolution code. These capabilities are enabled via a comprehensive formal syntax and semantics that connects a small, but sufficiently expressive programming language, with a detailed operational model of a distributed system containing a server-pool and multiple client devices. Note that servers are also referred to as "hosts" herein. These models are connected by fork-join automata (an abstract data type supporting eventual consistency) derived automatically from the schema described herein.

1.1 System Overview:

As noted above, the "Eventually Consistent Sharing Model" uses revision diagrams or corresponding fork-join automata to track the forking and joining of updates or changes to versions of shared data, and uses "cloud types" to define the structure of that data in such a way as to enable a fully automatic conflict resolution relative to the different updates. The processes summarized above are illustrated by the general system diagram of FIG. 1.

In particular, the system diagram of FIG. 1 illustrates the interrelationships between program modules for implementing various embodiments of the Eventually Consistent Sharing Model, as described herein. Furthermore, while the system diagram of FIG. 1 illustrates a high-level view of various embodiments of the Eventually Consistent Sharing Model, FIG. 1 is not intended to provide an exhaustive or complete illustration of every possible embodiment of the Eventually Consistent Sharing Model as described throughout this document.

In addition, it should be noted that any boxes and interconnections between boxes that may be represented by broken or dashed lines in FIG. 1 represent alternate embodiments of the Eventually Consistent Sharing Model described herein, and that any or all of these alternate embodiments, as described below, may be used in combination with other alternate embodiments that are described throughout this document.

In general, as illustrated by FIG. 1, the processes enabled by the Eventually Consistent Sharing Model begin operation by providing a set 120 of predefined "cloud data types" to a Fork-Join Model Construction Module 110.

The Fork-Join Model Construction Module 110 uses the set 120 of predefined "cloud data types" to construct fork-join automata based on revision diagrams. The fork-join automata are then provided to a Server Module 115 that uses one or more servers (i.e., single server or server pool) to track any changes that are made to a primary replica of shared data that is forked to and shared between a plurality of computing devices in a networked or cloud computing environment.

Further, a Conflict Resolution Module 130 operates to resolve any conflicts between shared data by using the fork-join automata associated with each corresponding "cloud data type" to merge or join changes to the shared data by any computing device.

In addition, a Client Module 140 for each of a plurality of client computing devices in a networked or cloud computing environment, uses one or more of the fork-join automata associated with each corresponding "cloud data type" to determine when to create local replicas of the shared data, when to merge or join local changes to local replicas of the shared data, and when to send updated copies of local replicas of the shared data to the server module for processing by the aforementioned Conflict Resolution Module 130.

2.0 Operational Details of the Eventually Consistent Sharing Model:

The above-described program modules are employed for implementing various embodiments of the Eventually Consistent Sharing Model. As summarized above, the Eventually Consistent Sharing Model provides various techniques for using revision diagrams to track the forking and joining of updates or changes to versions of shared data, and uses "cloud types" to define the structure of that data in such a way as to enable a fully automatic conflict resolution relative to the different updates.

The following sections provide a detailed discussion of the operation of various embodiments of the Eventually Consistent Sharing Model, and of exemplary methods for implementing the program modules described in Section 1, with respect to FIG. 1. In particular, the following sections provides examples and operational details of various embodiments of the Eventually Consistent Sharing Model, including: an overview of the use of revision diagrams for sharing data among concurrent tasks, eventually consistent transactions; and composable data types for eventual consistency.

2.1 Revision Diagrams for Sharing Data Among Concurrent Tasks:

As noted above, the use of the use of revision diagrams for sharing data among concurrent tasks is described in detail in co-pending U.S. patent application Ser. No. 12/965,070, filed on Dec. 10, 2010, by Burckhardt, et al., and entitled "SHARING DATA AMONG CONCURRENT TASKS," the subject matter of which is incorporated herein by this reference.

In general, the co-pending U.S. Patent Application describes a fork-join model of concurrency that uses a combination of snapshot isolation and deterministic conflict resolution to simplify the parallelization of tasks that exhibit conflicts. The Concurrent Sharing Model provides various techniques wherein shared states, data, or variables are conceptually replicated on forks, and only copied or written if necessary, then deterministically merged on joins, based on the defined isolation type of the shared data, thereby allowing concurrent tasks to work with independent local copies of the shared states, data, or variables while ensuring automated conflict resolution. This model is applicable to a wide variety of system architectures, including tasks or that execute tasks on CPUs or GPUs (or some combination thereof), tasks or applications that run, in full or in part, on multi-core processors without full shared-memory guarantees, and tasks or that run within cloud computing environments.

More specifically, the co-pending U.S. Patent Application describes a "Concurrent Sharing Model" that provides various embodiments of a programming model based on "revisions" and "isolation types" for concurrent revisions of states, data, or variables shared between two or more concurrent tasks (i.e., tasks, variables, applications, programs, etc.). This model enables revisions (also referred to as "replicas") of shared states, data, or variables to maintain determinacy despite nondeterministic scheduling between concurrent tasks.

The present document expands the use of revision diagrams relative to the co-pending U.S. Patent Application by providing various techniques for using revision diagrams to track the forking and joining of versions of shared data, thus tracking updates made to replicas of that data, and using "cloud types" to define the structure of the data in such a way as to enable a fully automatic conflict resolution. Note that the co-pending U.S. Patent Application uses the term "isolation types" to refer to the same general concept as the term "cloud types" as discussed in this document, except that the cloud types described herein are used in the context of cloud-based applications.

Further, while the previous use of revision diagrams described in the co-pending patent application describes revision diagrams and conflict resolution for sharing data among concurrent tasks, the Eventually Consistent Sharing Model provides a simpler, more direct definition for conflict resolution using various definitions for revision diagram graph construction rules (for constructing fork-join automata). In addition, while the co-pending patent application is generally directed towards enabling deterministic parallel programming, the Eventually Consistent Sharing Model enables eventually consistent transactions in a distributed system (e.g., shared data replicas in a cloud-based or other network environment). In particular, eventually consistent transactions exhibit pervasive nondeterminism caused by factors that are by definition outside the control of the system, such as network partitions.

2.2 Eventually Consistent Transactions:

When distributed clients query or update shared data, eventual consistency can provide better availability than strong consistency models. However, programming and implementing such systems can be difficult unless a reasonable consistency model is established, i.e., some minimal guarantees that programmers can understand and that systems can provide effectively.

Advantageously, as described in the following paragraphs, the Eventually Consistent Sharing Model enables eventually consistent transactions that provide a consistency model for: (1) generalizing earlier definitions of eventual consistency; and (2) that shows how to make some strong guarantees (e.g., transactions never fail, all code runs in transactions) to compensate for weak consistency. Further, the following paragraphs show that revision diagrams (and fork-join automata derived from those revision diagrams) provide a convenient way to build correct implementations of eventual consistency by relying on just a handful of simple rules that are easily visualized using diagrams.

Unlike serializable transactions, eventually consistent transactions are ordered by two order relations (visibility and arbitration) rather than a single order relation. A handful of simple operational rules for managing replicas, versions and updates based on graphs called revision diagrams are used to demonstrate that eventually consistent transactions can be effectively implemented. These rules are provably sufficient to guarantee correct implementation of eventually consistent transactions. Examples of various operational models of systems (e.g., single host or server and host or server pool type implementations) that provide eventually consistent transactions are provided below in Section 2.2.7.

2.2.1 Overview of Eventual Consistency:

In realizing the potential of eventual consistency, the Eventually Consistent Sharing Model provides answers to several questions, including:

How can consistency guarantees be provided that are as strong as possible without forsaking lazy consensus?; and How can systems that provide those guarantees be effectively understood and implemented?

The Eventually Consistent Sharing Model provides a two-pronged solution to these questions, based on: (1) a notion of transactions for eventual consistency, and (2) a general implementation technique using fork-join automata based on revision diagrams.

Eventually consistent transactions differ significantly from traditional transactions, as they are not serializable. Nevertheless, they uphold traditional atomicity and isolation guarantees. Advantageously, eventually consistent transactions exhibit some strong properties that simplify programming and are not offered by traditional transactions. In particular, eventually consistent transactions: (1) cannot fail and never roll back, and (2) all code, even long-running tasks, can run inside transactions without compromising performance.

The specification of eventually consistent transactions described herein is based on a formalization that uses mathematical techniques (e.g., sets of events, partial orders, and equivalence relations) that are commonly used in research on relaxed memory models and transactional memory. The definition of eventually consistent transactions used by the Eventually Consistent Sharing Model provides immediate insight on how eventual consistency is related to strong consistency: specifically, eventual consistency uses two separate order relations (visibility order and arbitration order) rather than a single order over transactions.

Revision diagrams provide programmers and system implementers with a simple set of rules for managing updates and replicas. Revision diagrams make the fork and join of versions explicit, which determines the visibility and arbitration of transactions. As discussed in further detail below, the Eventually Consistent Sharing Model guarantees that any system following the revision diagram rules provided herein will provide eventually consistent transactions according to the abstract definition.

As noted above, the Eventually Consistent Sharing Model introduces the concept of eventually consistent transactions and provides a concise and abstract definition for this concept. In addition, the Eventually Consistent Sharing Model provides a systematic approach for building systems that support such transactions, based on a precise, operational definition of revision diagrams. Further, the revision diagram rules described herein are sufficient to guarantee eventual consistency.

2.2.2 Problem Formulation and General Definitions:

In general, a "database" as discussed herein, is considered to be an abstract data type that is semantically defined by the operations it supports to update them and retrieve data. In view of this concept, the following paragraphs define some precise terminology that will be used through this document.

Definition 1: In consideration of common definitions of abstract data types, a "query-update" interface is defined as a tuple (Q, V, U) where:

1. Q is an abstract set of query operations;
2. V is an abstract set of values returned by queries; and
3. U is an abstract set of update operations.

Note that the sets of queries, query results, and updates are not required to be finite (and usually are not). Query-update interfaces can apply in various scenarios, where they may describe abstract data types, relational databases, or simple random-access memory, for example. For databases, queries are typically defined recursively by a query language.

For example, consider a random-access memory that supports "loads" and "stores" of bytes in a 64-bit memory address space, A, where $A=\{a \in \mathbb{N} \mid 0 \leq a \leq 2^{64}\}$. For this example the abstract set of query operations, Q, is defined as $Q=\{load(a) \mid a \in A\}$, $V=\{v \in \mathbb{N} \mid 0 \leq v \leq 2^8\}$ and the abstract set of update operations, U is defined as $U=\{store(a, v) \mid a \in A$ and $v \in V\}$. Note that this memory example will be used throughout this document for purposes of illustration and explanation. Further, most databases also fit in this abstract interface where the queries are SQL queries and the update operations are SQL updates like insertion and deletion.

Definition 2: With respect to the "interfaces" introduced above, the most direct way to define the semantics of queries and updates is to relate them to some notion of state, by defining a "query-update automaton" (QUA) for the interface (Q, V, U) as a tuple $(S, s_0)$ where S is a set of states with:

1. an initial state $s_0 \in S$;
2. an interpretation $q^\#$ of each query $q \in Q$ as a function $S \rightarrow V$; and
3. an interpretation $u^\#$ of each update operation $u \in U$ as a function $S \rightarrow S$.

For example, the random-access memory interface described in the example above can be represented by a QUA $(S, s_0)$ where S is the set of total functions $A \rightarrow V$, and where $s_0$ is the constant function that maps all locations to zero, and where $load(a)^\#(s)=s(a)$ and $store(a, v)^\#(s)=s[a \mapsto v]$.

QUAs can naturally support abstract data types (e.g., collections, or even entire documents) that offer higher-level operations (queries and updates) beyond just loads and stores. Such data types are often useful when programming against a weak consistency model, since they can ensure that the data representation remains intact when handling concurrent and potentially conflicting updates.

The following two characteristics of QUAs are provided for purposes of explanation to understand how they relate to other definitions of abstract data types:

1. First, there is a strict separation between query and update operations: it is not possible for an operation to both update the data and return information to the caller; and
2. Second, all updates are total functions. It is thus not possible for an update to 'fair'; however, it is of course possible to define updates to have no effect in the case some precondition is not satisfied.

For example, the problem formalization provided by the Eventually Consistent Sharing Model will not allow a classic stack abstract data type with a pop operation for two reasons: (1) pop both removes the top element of the stack and returns it, so it is neither an update nor a query; and (2) pop is not total, i.e., it cannot be applied to the empty stack.

This restriction is central to the concept of enabling eventual consistency, where the sequencing and application of updates may be delayed, and updates may thus be applied to a different state than the one in which they were originally issued by the program.

2.2.3 Clients and Transactions:

Problem formulation becomes more interesting and challenging when considering a distributed system, such as, for example, a cloud-based environment wherein multiple clients may join or disconnect at any time while sharing some database.

The participants of this type of distributed system are referred to herein as "clients." Clients typically reside on physically distinct devices, but are not required to do so. When clients in a distributed system issue queries and updates against some shared QUA, the Eventually Consistent Sharing Model provides an explicit definition of what consistency programmers can expect. This consistency model also addresses the semantics of "transactions," which provide clients with the ability to perform several updates as an atomic "bundle."

More specifically, the problem of a distributed system can be formally represented by defining a set C of clients. Each client, at its own speed, issues a sequence of transactions. Supposedly, each client runs some form of arbitrary program (the details of which are not relevant to the discussion provided herein, and are therefore unspecified for purposes of simplicity and generality). This arbitrary program determines when to begin and end a transaction, and what operations to perform in each transaction, which may depend on various factors, such as the results returned by queries, or external factors such as user inputs.

For uniformity, the Eventually Consistent Sharing Model assumes that all operations are part of a transaction. This assumption comes at no loss of generality since a device that does not care about transactions can simply issue each operation in its own transaction.

Since all operations are inside transactions, it is not necessary to distinguish between the end of a transaction and the beginning of a transaction. Formally, the activities on a device can be represented as a stream of operations (queries or updates) interrupted by special "yield" operations that mark the transaction boundary. This operation is referred to as "yield( )" since it is semantically similar to a yield that is typically seen on a uniprocessor performing cooperative multitasking, where such a yield marks locations where other threads may read and modify the current state of the data, while at all other locations, only the current thread may read or modify the state.

In view of these definitions and explanations, the interaction between the arbitrary programs executing on the clients and the database can be fully described by the following three types of operations:

1. Updates $u \in U$ issued by the arbitrary program;
2. Pairs (q, v) representing a query $q \in Q$ issued by the arbitrary program, together with a response $v \in V$ by the database system; and
3. The yield operations issued by the arbitrary program.

Definition 3: A history H for a set C of clients and a query-update interface (Q, V, U) is a map H that maps each client c∈C to a finite or infinite sequence H(c) of operations from the alphabet $\Sigma = U \cup (Q \times V) \cup \{yield\}$.

Note that the history H does not a priori include a global ordering of events, since such an order is not always meaningful when working with relaxed consistency models. Rather, the existence of certain orderings, subject to certain conditions, is what determines whether a history satisfies a consistency model or not.

2.2.3.1 Notation and Terminology:

To think about a history H, it is helpful to introduce the following auxiliary terminology. First, let $E_H$ be the set of all events in H, which means all occurrences of operations in $\Sigma \backslash \{yield\}$ in the sequences H(c) (where yield is considered to be just a marker within the operation sequence, but not an event).

For a client c, a maximal nonempty contiguous subsequence of events in H(c) that does not contain yield is referred to herein as a "transaction of c."

A transaction is referred to as "committed" if it is succeeded by a yield operation, and "uncommitted" otherwise.

$T_H$ is the set of all transactions of all clients, and committed($T_H$) ⊆ $T_H$ is the subset of all committed transactions. For an event e, trans(e)∈$T_H$ is the transaction that contains e. Moreover, committed($E_H$) ⊆ $E_H$ is the subset of events that are contained in committed transactions.

Following are specific definitions related to ordering events and transactions:

"Program order": For a given history H, a partial order $<_p$ is defined over events in H such that $e<_p e'$ if and only if (iff) e appears before e' in some sequence H(c).

"Apply in order": For a history H, for a state s∈S, for a subset of events $E' \in E_H$, and for a total order < over the events in E', the expression apply(E', <, s) represents the state obtained by applying all updates appearing in E' to the state s, in the order specified by <.

"Factoring": An equivalence relation $\sim_t$ (same-transaction) is defined over events such that $e \sim_t e'$ iff trans(e)=trans(e'). For any partial order ≺, over events, it is said that ≺ factors over $\sim_t$ iff for any events x and y from different transactions, x≺y implies x'≺y' for any x,y such that $x \sim_t x'$ and $y \sim_t y'$. This is a useful property to have for any ordering ≺, since if ≺ factors over $\sim_t$, it induces a corresponding partial order on the transactions.

2.2.4 Sequential Consistency:

Sequential consistency posits that the observed behavior is consistent with an interleaving of the transactions by the various devices or clients. This interleaving is formalized herein as a partial order over events (rather than a total order as more commonly used) since some events are not instantly ordered by the system; for example, the relative order of operations in uncommitted transactions may not be fully determined at any particular point in time.

Definition 4:, A history H is "sequentially consistent" if there exists a partial order< over the events in $E_H$ that satisfies the following conditions for all events $e_1$, $e_2$, e∈$E_H$:
1. Compatible with program order: if $e_1 <_p e_2$ then $e_1 < e_2$;
2. Total order on past events: if $e_1 < e$ and $e_2 < e$ then either $e_1 < e_2$, or $e_2 < e_1$;
3. Consistent query results: for all (q, v)∈$E_H$, $v=q^\#$,(apply ({e∈(H)|e<q}, <, $s_0$)). In other words, the expression simply says that a query returns the state as it results from applying all past updates to the initial state;
4. Atomicity: < factors over $\sim_t$;
5. Isolation: if $e_1 \notin$ committed($E_H$) and $e_1 < e_2$, then $e_1 <_p e_2$. That is, events in uncommitted transactions precede only events on the same client; and 6. Eventual delivery: for all committed transactions t∈committed($T_H$), there exist only finitely many transactions t'∈$T_H$ such that t<t'.

Note that sequential consistency fundamentally limits availability in the presence of network partitions. The reason is that any query issued by some transaction t must see the effect of all updates that occur in transactions that are globally ordered before t, even if on a remote device. Thus, sequential consistency models cannot conclusively commit transactions in the presence of network partitions.

2.2.5 Eventual Consistency:

In contrast to conventional techniques that attempt to provide eventual consistency using timestamps (for time of operation), the Eventually Consistent Sharing Model provides various techniques that arbitrate updates without using timestamps or requiring commutativity. Note that the Eventually Consistent Sharing Model does consider a time of connection with respect to revision diagrams, as discussed in further detail herein. However, timestamps (for time of operation) are not used because they exhibit the well-known write stabilization problem, i.e., the inability to finalize the effect of updates while older updates may still linger in disconnected network partitions.

For example, consider a mobile user called Robinson performing an important update, but being stranded on a disconnected island before transmitting it. When Robinson reconnects after years of exile, Robinson's update is older than (and may thus alter the effect of) all the updates committed by other users in the meantime. Therefore, either (1) none of these updates can stabilize until Robinson returns, or (2) after some timeout the system gives up on Robinson and discards his update. Clearly, neither of these solutions is satisfactory. Therefore, the solution provided by the Eventually Consistent Sharing Model abandons timestamps and instead uses an arbitration order that orders Robinson's update after all the other updates using revision diagrams, as discussed in further detail below in Section 2.2.7.

In general, eventual consistency relaxes sequential consistency (see Section 2.2.4) by allowing queries in a transaction t to see only a subset of all transactions that are globally ordered before t. It does so by distinguishing between a visibility order (a partial order that defines what updates are visible to a query), and an arbitration order (a partial order that determines the relative order of updates).

Definition 5: A history H is eventually consistent if there exist two partial orders $<_v$ (the visibility order) and $<_a$ (the arbitration order) over events in H, such that the following conditions are satisfied for all events $e_1$, $e_2$, e∈$E_H$:
1. Arbitration extends visibility: if $e_1 <_v e_2$ then $e_1 <_a e_2$;
2. Total order on past events: if $e_1 <_v e$ and $e_2 <_v e$, then either $e_1 <_a e_2$, or $e_2 <_a e_1$;
3. Compatible with program order: if $e_1 <_p e_2$ then $e_1 <_v e_2$;
4. Consistent query results: for all (q, v)∈$E_H$, $v=q^\#$(apply ({e∈H)|e$<_v$q}, $<_a$, $s_0$)). In other words, the expression simply says that a query returns the state as it results from applying all preceding visible updates (as determined by the visibility order) to the initial state, in the order given by the arbitration order;
5. Atomicity: Both $<_v$ and $<_a$ factor over $\sim_t$;
6. Isolation: if $e_1 \notin$ committed($E_H$) and $e_1 <_v e_2$, then $e_1 <_p e_2$. In other words, the expression simply says that events in uncommitted transactions are visible only to later events by the same client;
7. Eventual delivery: for all committed transactions t∈committed($T_H$), there exist only finitely many transactions t'∈$T_H$ such that $t <_v t'$.

The reason why eventual consistency can tolerate temporary network partitions while sequential consistency cannot tolerate temporary network partitions is that the arbitration order can be constructed incrementally, i.e., the arbitration order may remain only partially determined for some time after a transaction commits. Consequently, the Eventually Consistent Sharing Model allows conflicting updates to be committed even in the presence of network partitions (or very long delays, as with the Robinson example).

Note that eventual consistency is a weaker consistency model than sequential consistency, as proved by the following statement:

Lemma 1: A sequentially consistent history is eventually consistent.

Proof: Given a history H that is sequentially consistent, there exists a partial order < satisfying all conditions. Now define $<_v = <_a = <$; then all conditions for eventual consistency follow easily.

2.2.6 Revision Consistency:

The definition of eventual consistency provided in Section 2.2.5 is concise and general. By itself, it is however not very constructive, insofar that it does not give practical guidelines as to how a system can efficiently and correctly construct the necessary ordering (visibility and arbitration). Therefore, the following paragraphs describe a more specific implementation technique for eventually consistent systems, based on the notion of revision diagrams (see Section 2.2.6.1 below).

Revision diagrams show an extended history not only of the queries, updates, and transactions by each client, but also of the forking and joining of revisions, which are logical replicas of the state. A client works with one revision at a time, and can perform operations (queries and updates) on it. Since different clients work with different revisions, clients can perform both queries and updates concurrently and in isolation (i.e., without creating race conditions). Reconciliation happens during join operations. When a revision joins another revision, it replays all the updates performed in the joined revision at the join point. This replay operation is conceptual. Note that rather than replaying a potentially unbounded log, actual implementations can often use much more space- and time-efficient merge functions, as explained in detail below in Section 2.2.7. After a revision is joined, no more operations can be performed on it. Therefore, clients may need to fork new revisions to keep enough revisions available.

Figure 2:
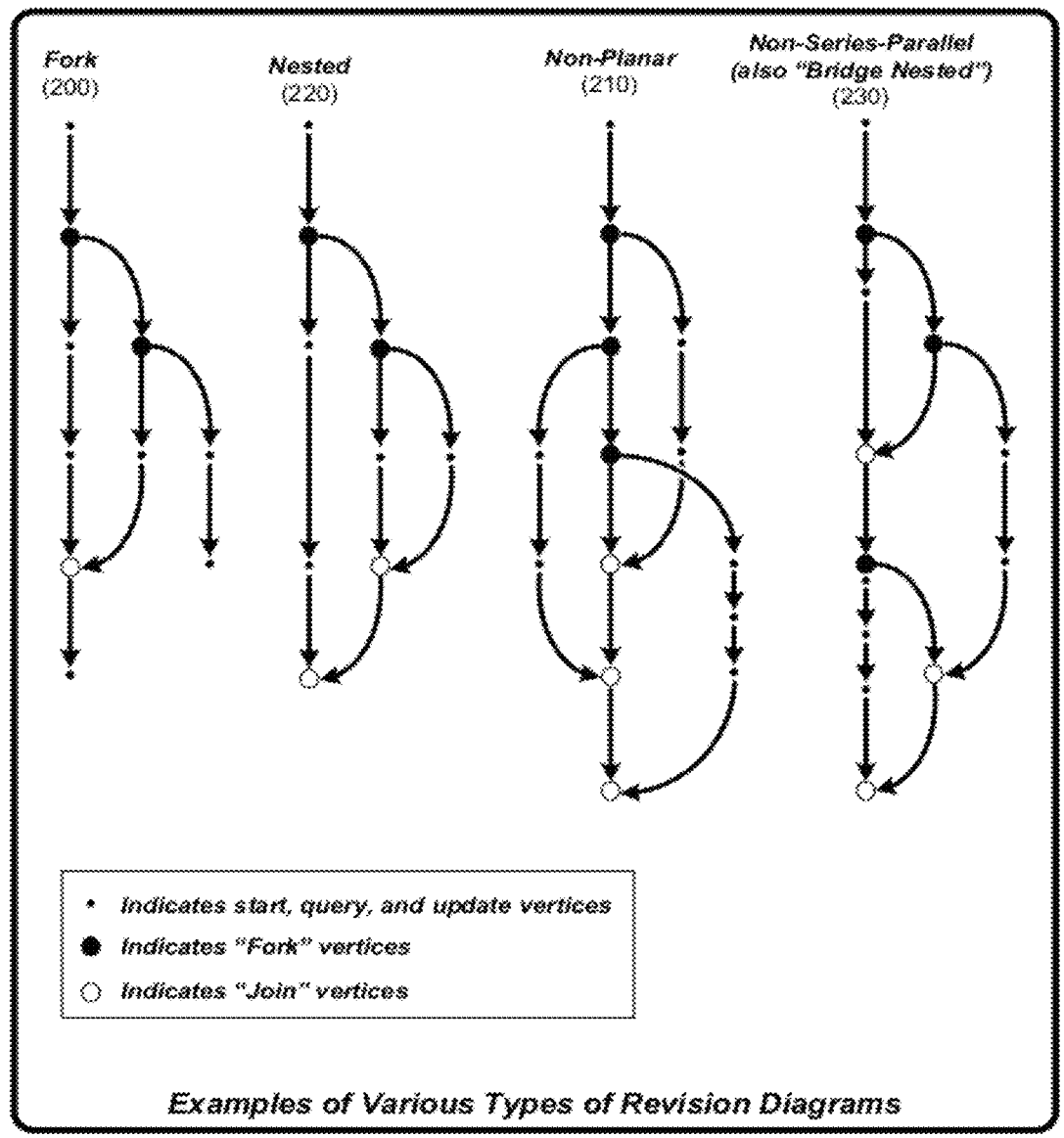
FIG. 2 provides an example of various types of "revision diagrams," as described herein.

2.2.6.1 Revision Diagrams:

Revision diagrams are directed graphs constructed from three types of edges (successor, fork, and join edges, or s-, f- and j-edges for short), and five types of vertices (start, fork, join, update, and query vertices). A start vertex represents the beginning of a revision, s-edges represent successors within a revision, and fork/join edges represent the forking and joining of revisions. As illustrated by FIG. 2, revision diagrams are pictorially represented using the following conventions:

The symbol "•" is used for start, query, and update vertices;

The symbols "●" and "○" are used for fork and join vertices, respectively;

Vertical down-arrows represent s-edges;

Horizontal-to-vertical curved arrows (i.e., arrows originating from fork vertices) represent f-edges; and Vertical-to-horizontal curved arrows (i.e., arrows returning to join vertices) represent j-edges.

For example, FIG. 2 illustrates a progression of revision diagram nesting examples. These examples include a "fork" 200 revision diagram, a "nested" 220 revision diagram, a "non-planar" 210 revision diagram, and a "non-series-parallel" 230 revision diagram. Note that the "non-series-parallel" 230 revision diagram type was also referred to as a "bridge nested" type of revision diagram in the aforementioned co-pending patent application. In general, the "non-series-parallel" 230 revision diagram shows that child revisions can "survive" their parents (i.e. be joined later), and that revisions can be joined by a different revision than where they were forked. The other revision diagrams are self-explanatory in view of the above definitions provided for vertices and edges. Finally, it should be understood that any of these types of revision diagrams, as well as others described in the aforementioned co-pending patent application may be combined to any degree of complexity desired in order to represent any number of clients and any number of revisions.

Note that a vertex x has a s-path (i.e., a path containing only s-edges) to vertex y if and only if they are part of the same revision. Since all s-edges are shown as vertical arrows in FIG. 2, vertices belonging to the same revision are aligned vertically. For any vertex x, let S(x) be the start vertex of the revision that x belongs to. Further, for any vertex x whose start vertex S(x) is not the root, F(x) is defined to be the fork vertex such that $$F(x) \xrightarrow{f} S(x)$$

(i.e., the fork vertex that started the revision x belongs to). A vertex with no outgoing s- or j-edges is referred to as a "terminal." Terminals are the last operation in a revision that can still perform operations (has not been joined yet), and thus represent potential extension points of the graph.

Following is a formal, constructive definition for revision diagrams, as implemented by the Eventually Consistent Sharing Model.

Definition 6: A revision diagram is a directed graph constructed by applying a (possibly empty or infinite) sequence of the following construction steps to a single initial start vertex (called the root):

1. Choose some terminal t, create a new query vertex x, and add an edge $$t \xrightarrow{s} x.$$

2. Choose some terminal t, create a new update vertex x, and add an edge $$t \xrightarrow{s} x.$$

3. Choose some terminal t, create a new fork vertex x and a new start vertex y, and add edges $$t \xrightarrow{s} x \text{ and } x \xrightarrow{f} y.$$

4. Choose two terminals t, t' satisfying the join condition $F(t') \rightarrow^* t$, then create a new join vertex x and add edges $$t \xrightarrow{s} x \text{ and } t' \xrightarrow{j} x.$$

Figure 3:
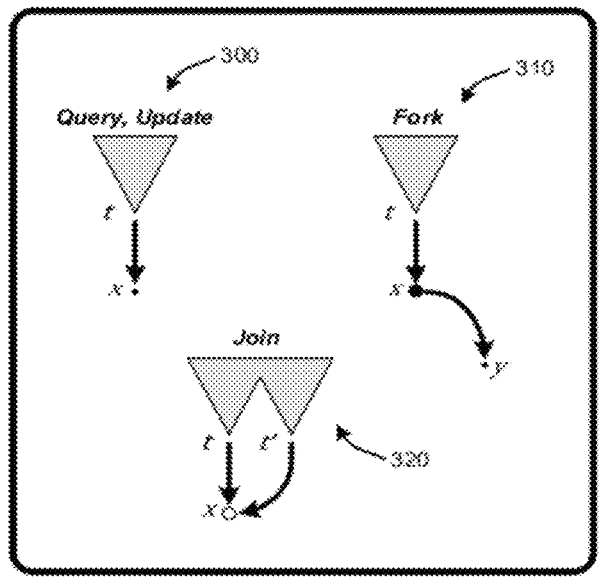
FIG. 3 provides a visualization of various construction rules for revision diagrams, as described herein.

FIG. 3 provides a simple visualization of the construction rules for revision diagrams. For example, FIG. 3 illustrates a "query, update" operation 300, a "fork" operation 310 and a "join" operation 320.

The join condition expresses that the terminal t (the "joiner") must be reachable from the fork vertex that started the revision that contains t' (the "joinee"). This condition makes revision diagrams more restricted than general task graphs. See FIG. 4 for some simple examples of invalid diagrams where the join condition does not hold at construction of the join nodes.

Figure 4:
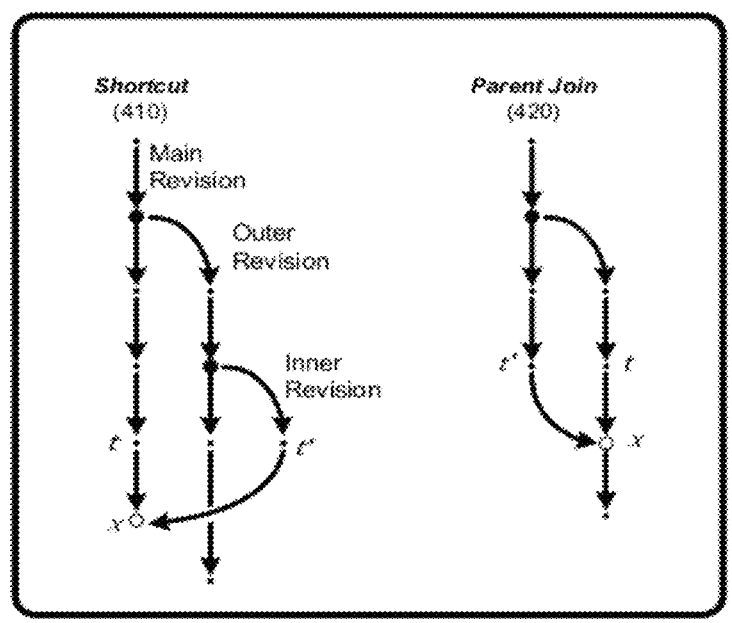
FIG. 4 provides some simple examples of invalid or non-functional revision diagrams where the join condition does not hold at construction of the join nodes, as described herein.

In particular, revision diagrams are semi-lattices, and thus, not all revision diagrams are functional because revision handles flow along edges of the revision diagram. FIG. 4 provides two simple examples of non-functional revision diagrams. In particular, FIG. 4 illustrates a "short-cut" 410 or cross-over type revision diagram where an inner revision is shown to join a primary or main revision by crossing over an outer revision. This illustrated "short-cut" 410 is non-functional because the main revision cannot join a revision before it has access to its handle (the handle returned by the second fork (to the inner revision) becomes accessible to the main revision only after the outer revision has been joined). For similar reasons, "parent-join" 420 type revision diagrams are also non-functional. More specifically, both diagrams (410 and 420) are non-functional since they violate the join property at the creation of the join node x. For example, in the "parent join" 420 revision diagram, F(t') is undefined on the main revision and therefore F(t')→*t does not hold.

It should be understood that the join condition described above has some consequences that may not be not immediately obvious. For example, as noted above, the join condition implies that revision diagrams are semi-lattices (as discussed in further detail in the aforementioned co-pending patent application). In addition, it ensures that, as discussed in further detail below with respect to "Theorem 1," if H is a history, and if a witness diagram for H exists such that no committed events are neglected, then H is eventually consistent. Furthermore, it still allows more general graphs than conventional "series-parallel graphs," which allow only the recursive serial and parallel composition of tasks (and are also called fork-join concurrency in some contexts, which should not be confused with the fork and join concepts described herein).

For instance, the right-most revision diagram in FIG. 2 (see revision diagram 230) is not a series-parallel graph but it is a valid revision diagram. While series-parallel graphs are easier to work with than revision diagrams, they are not flexible enough for use by the Eventually Consistent Sharing Model, since they would enforce too much synchronization between participants (i.e., devices or clients).

Also, note that fork and the join are fundamentally asymmetric: the revision that initiates the fork (the "forker") continues to exist after the fork, but also starts a new revision (the "forkee"), and similarly, the revision that initiates the join (the "joiner") can continue to perform operations after the join, but ends the joined revision (the "joinee").

2.2.6.2 Graph Properties:

In general, revision diagrams are connected, and all vertices are reachable from the root vertex. There can be multiple paths from the root to a given vertex, but exactly one of those is free of j-edges.

Definition 7: For any vertex v in a revision diagram, let the root-path of v be the unique path from the root to v that does not contain j-edges.

2.2.6.3 Query and Update Semantics:

The following paragraphs explain how to determine the results of a query in a revision diagram. The basic idea is to: (1) return a result that is consistent with applying all the updates along the root path, and (2) if there are join vertices along that path, they summarize the effect of all updates by the joined revision.

Figure 5:
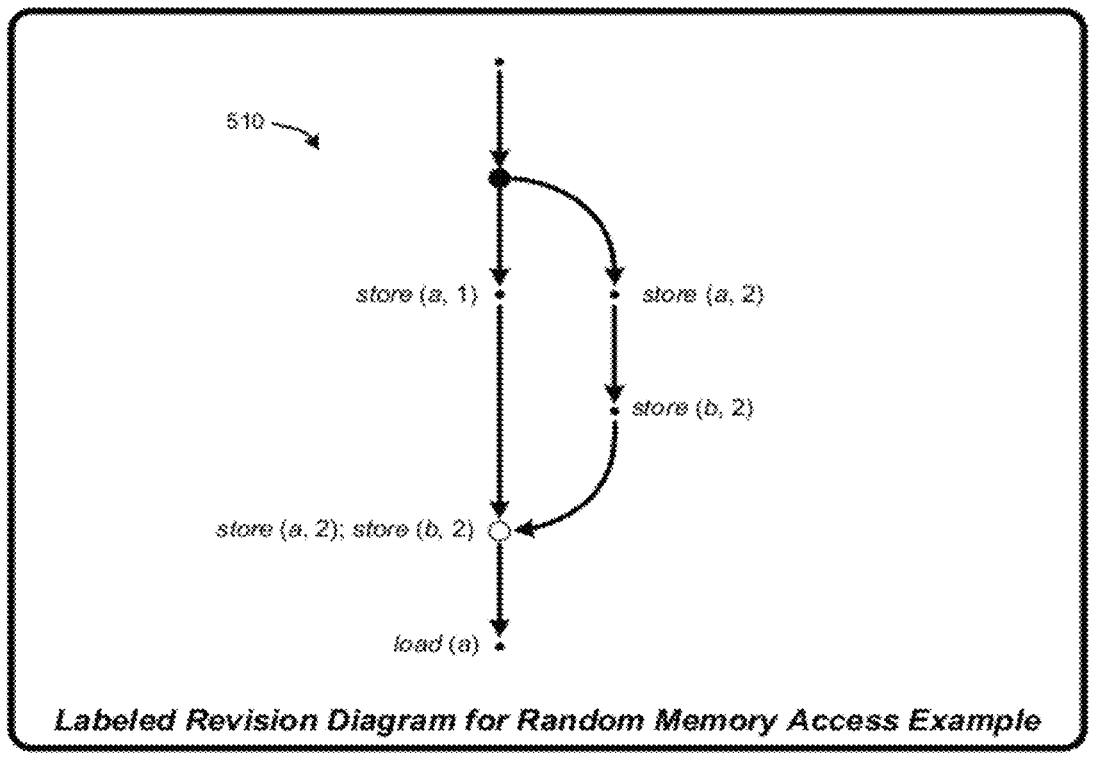
FIG. 5 provides an illustration of a labeled revision diagram for a random memory access example, as described herein.

For example, FIG. 5 provides an example of a revision diagram 510 labeled with the operations of the random access memory example described above in Section 2.2.2. As illustrated, the join vertex is labeled with the composition of all update operations of the joinee. The path-result of the final query node load(a) can now be evaluated by applying to the composition of all update operations along the root-path: $load(a)^{\#}(store(b, 2)^{\#}(store(a, 2)^{\#}(store(a, 1)^{\#}(s_0))))=2$.

This concept is defined more formally below. Note that for purposes of simplifying the following discussion, a fixed query-update interface (Q, V, U) and QUA (S, $s_0$) is assumed for the rest of this section.

Definition 8: For any vertex x, the effect of x is a function $x°:S \to S$ defined inductively by the following conditions:
1. If x is a start, fork, or query vertex, the effect is a no-op, i.e., $x°(s)=s$;
2. If x is an update vertex for the update operation u, then the effect is that update, i.e., $x°(s)=u^{\#}(s)$;
3. If x is a join vertex, then the effect is the composition of all effects in the joined revision, i.e., if $y_1, \ldots, y_n$, is the sequence of vertices in the joined revision (i.e., $y_1$, is a start vertex, $$y_i \xrightarrow{s} y_{i+1}$$

for all $1 \leq i < n$, and $$y_n \xrightarrow{j} x),$$

then $x°(s)=Y°_n(y°_{n-1}( \ldots y_1°(s)))$.

Given the above, the expected query result can be defined as follows:

Definition 9: Let x be a query vertex with query q, and let $(y_1, \ldots, y_n, x)$ be the root path of x. Then, the path-result of x is defined as $q^{\#}$, $(y°_n)(y°_{n-1}( \ldots y°_1(s_0)))$.

2.2.6.4 Revision Diagrams and Histories:

Histories (H) can be naturally related to revision diagrams by associating each query event (q, v)∈$E_H$ with a query vertex, and each update event u∈$E_H$ with an update vertex. The intention is to validate the query results in the history using the path results, and to keep transactions atomic and isolated by ensuring that their events form contiguous sequences within a revision.

Definition 10: A revision diagram is referred to as a "witness" for the history H if it satisfies the following conditions:
1. For all query events (q, v) in $E_H$, the value v matches the path-result of the query vertex;
2. If x,y are two successive non-yield operations in H(c) for some c, then they must be connected by a s-edge;
3. If x is the last event of H(c) for some c and not a yield, then it must be a terminal; and
4. If x,y are two operations preceding and succeeding some yield in H(c) for some c, then there must exist a path from x to y. In other words, the beginning of a transaction must be reachable from the end of the previous transaction.

Note that a history H is referred to as "revision-consistent" if there exists a witness revision diagram.

To ensure eventual delivery of updates, the Eventually Consistent Sharing Model ensures that there are enough forks and joins. However, to formulate a "liveness" condition on infinite histories, the concept of "neglected vertices" is defined as follows:

Definition 11: A vertex x in a revision diagram is referred to as "neglected" if there exists an infinite number of vertices y such that there is no path from x to y.

In view of the definitions and explanations provided above, Theorem 1, is stated and proved below:

Theorem 1: Let H be a history. If there exists a witness diagram for H such that no committed events are neglected, then H is eventually consistent.

Note that this theorem provides a solid basis for implementing eventually consistent transactions because an implementation can be based on dynamically constructing a witness revision diagram and, as a consequence, guarantees eventually consistent transactions. Moreover, as discussed in further detail below in Section 2.2.7, implementations do not need to actually construct such witness diagrams at runtime but can rely on efficient state-based implementations (i.e., automata).

2.2.7 Examples of Server-Based Implementations:

Revision diagrams can help to develop efficient implementations for a wide variety of practical applications since they provide a solid abstraction that decouples the consistency model from actual implementation choices. The following paragraphs describe some exemplary implementation techniques that are likely to be useful for that purpose. In particular, three examples of client-server systems that implement eventual consistency are described in the following paragraphs.

It should be understood that actual revision diagrams do not need to be constructed to enable the forking and joining techniques described herein. These diagrams are provided herein for purposes of explanation. However, it is usually not necessary for implementations of a system enabled by the Eventually Consistent Sharing Model to store the actual revision diagram. Instead, it has been found to be highly advantageous to work with state representations (referred to herein as "fork-join automata") that can directly provide fork and join operations.

Definition 12: A fork-join QUA (FJ-QUA) for a query-update interface (Q,V,U) is a tuple ($\Sigma$, $\sigma_0$, f, j) where:

1. ($\Sigma,\sigma_0$) is a QUA over (Q,V,U);
2. f: $\Sigma \rightarrow \Sigma \times \Sigma$; and
3. j: $\Sigma \times \Sigma \rightarrow \Sigma$.

Given a fork-join query-update automaton (i.e., a FJ-QUA), a $\Sigma$-state can be simply associated with each revision, with all queries and updates then being performed locally on that state, without communicating with other revisions. The join function of the FJ-QUA, if implemented correctly, guarantees that all updates are applied at the join time. This concept is stated more formally by Definition 13, as follows:

Definition 13: For a FJ-QUA ($\Sigma$, $\sigma_0$, f, j) and a revision diagram over the same interface (Q, V, U), define the state $\sigma(x)$ of each vertex x inductively by setting $\sigma(r)=\sigma^0$, for the initial vertex r, and (for the construction rules as they appear in Definition 6):

1. Query—Let $\sigma(x)=\sigma(t)$;
2. Update—Let $\sigma(x)=u^\#(\sigma(t))$;
3. Fork—Let $(\sigma(x), \sigma(y))=f(\sigma(t))$; and
4. Join—Let $\sigma(x)=j(\sigma(t), \sigma(t'))$.

Definition 14: A FJ-QUA ($\Sigma$, $\sigma_0$, f, j) implements the QUA (S, $s_0$) over the same interface iff for all revision diagrams, for all vertices x, the locally computed state $\sigma(x)$ (as in Definition 13) matches the path result (as in Definition 9).

For example, consider the QUA representing random access memory using the random access memory example described above in Section 2.2.2. This QUA can be implemented using a FJ-QUA that maintains a "write-set" as follows:

$$\Sigma = S \times \mathcal{P}(A)$$

$$\sigma_0 = (s_0, \phi)$$

$$load(a)^\#(s, W) = s(a)$$

$$store(a, v)^\#(s, W) = (s[a \mapsto v], W \cup \{a\})$$

$$f(s, W) = ((s, W), (s, \phi))$$

$$j((s_1, W_1), (s_2, W_2)) = (s', W_1 \cup W_2) \text{ where}$$

$$s'(a) = \begin{cases} s_1(a) & \text{if } a \notin W_2 \\ s_2(a) & \text{if } a \in W_2 \end{cases}$$

The write set (together with the current state) provides sufficient information to conceptually replay all updates during join (since only the last written value matters). Note that the write set is cleared on forks.

Since a log of updates can be stored inside $\Sigma$, it is always possible to provide an FJ-QUA for any QUA. However, more space-effective implementations are often possible for QUAs since logs are typically compressible.

Note also that FJ-QUA's also referred to herein as "fork-join automaton" are discussed in further detail in Section 2.3.4 with respect to their implementation for various "cloud types."

Given a FJ-QUA, eventually consistent systems can be implemented quite easily. Below are two exemplary models that demonstrate this principle.

2.2.7.1 Single Synchronous Server Model:

This exemplary model uses a single server. First, define the set of devices $I=C \cup \{s\}$ where C is the set of clients and s is the single server. On each device i, a state from the FJ-QUA is stored, that is, R: $I \rightarrow \Sigma$. To keep the transition rules simple for purposes of explanation, the notation $R[i \mapsto \sigma]$ is used to denote the map R modified by mapping i to $\sigma$, and $R(c \mapsto \sigma)$ is defined as a pattern that matches R, c, and $\sigma$ such that $R(c)=\sigma$. Each client can perform updates and queries while reading and writing only the local state, as shown below:

$$\text{UPDATE}(c, u): \frac{\sigma' = u^\#(\sigma)}{R(c \mapsto \sigma) \rightarrow R[c \mapsto \sigma']} \quad \text{Equation (1)}$$

$$\text{QUERY}(c, q, v): \frac{q^\#(\sigma) = v}{R(c \mapsto \sigma) \rightarrow R} \quad \text{Equation (2)}$$

As for synchronization, two rules are provided, one to create a new client (forking the server state), and one to perform the yield on the client (joining the client state into the server, then forking a fresh client state from the server), as shown below:

$$\text{SPAWN}(c): \frac{c \notin domR \quad f(\sigma) = (\sigma_1, \sigma_2)}{R(s \mapsto \sigma) \rightarrow R[s \mapsto \sigma_1][c \mapsto \sigma_2]} \quad \text{Equation (3)}$$

-continued $$\text{YIELD}(c): \frac{j(\sigma_1, \sigma_2) = \sigma_3 \quad f(\sigma_3) = (\sigma_4, \sigma_5)}{R(s \mapsto \sigma_1)(c \mapsto \sigma_2) \to R[s \mapsto \sigma_4][c \mapsto \sigma_5]} \quad \text{Equation (4)}$$

In view of Theorem 1, it can be seen that this system is eventually consistent. By induction over the transitions, it can be seen that each state σ appearing in R corresponds to a terminal in the revision diagram, and each transition rule manipulates those terminals (applying fork, join, update or query) in accordance with the revision diagram construction rules. In particular, the join condition is always satisfied since all forks and joins are performed by the same server revision. Transactions are not interrupted by forks or joins, and no vertices are neglected: each yield creates a path from the freshly committed vertices into the server revision, from where it must be visible to any new clients, and to any client that performs an infinite number of yields.

An interesting observation is that if the fork does not modify the left component (i.e., for all σ∈Σ, f(σ)=(σ, σ+) for some σ'), the server is effectively stateless, in the sense that it does not store any information about the client. This is a highly desirable characteristic for scalability, and has been demonstrated to be well worth the effort to define FJ-QUAs that have this property.

2.2.7.2 Server Pool Model:

While the single server model described above is useful, the use of a server pool consisting of one or more primary servers and one or more secondary servers provides additional advantages. For example, in the single server case, clients performing a yield access both server and client state. This means clients block if they have no connection. In addition, a single server may not be sufficient to scale to large numbers of clients, depending upon factors such as the total number of clients, bandwidth considerations, etc.

These issues are addressed by using a server pool rather than a single server. In particular, the set of devices is I=C∪S where S is a set of server identifiers. Using multiple servers not only improves scalability, but it helps with disconnected operation as well: if one "server" is maintained for each client (e.g., on the same mobile device), it can be guaranteed that the client does not block on yield. In other words, yield is non-blocking. Servers themselves can then perform a sync operation (at any convenient time) to exchange state with other servers.

However, additional information is maintained in each device to ensure that the join condition is maintained. In particular the Eventually Consistent Sharing Model ensures that the join condition is maintained by:

1. Storing on each client c a pair (σ, n) where a is the revision state as before, and n is a counter indicating the current transaction; and
2. Storing on each server s a triple (σ, J, L) where σ is the revision state as before, J is the set of servers that s may join, and L is a vector clock (a partial function (I→ℕ)) indicating for each client the latest transaction (also referred to herein as a "round number" as discussed in Section 2.3.3) of c that s may join.

The transitions that involve the client are then as follows:

$$\text{UPDATE}(c, u): \frac{\sigma' = u^\#(\sigma)}{R(c \mapsto (\sigma, n)) \to R[c \mapsto (\sigma', n)]} \quad \text{Equation (5)}$$

$$\text{QUERY}(c, q, v): \frac{q^\#(\sigma) = v}{R(c \mapsto (\sigma, L)) \to R} \quad \text{Equation (6)}$$

$$\text{SPAWN}(c): \frac{c \notin domR \quad f(\sigma) = (\sigma_1, \sigma_2) L' = L[c \mapsto 0]}{R(s \mapsto (\sigma, J, L)) \to R[s \mapsto (\sigma_1, J, L')][c \mapsto (\sigma_2, 0)]} \quad \text{Equation (7)}$$

$$\text{YIELD}(c): \frac{L(c) = n \quad L' = L[c \mapsto n+1] \quad j(\sigma_1, \sigma_2) = \sigma_3 \quad f(\sigma_3) = (\sigma_4, \sigma_5)}{R(s \mapsto (\sigma_1, J, L))(c \mapsto (\sigma_2, n)) \to R[s \mapsto (\sigma_4, J, L')][c \mapsto (\sigma_5, n+1)]} \quad \text{Eqn. (8)}$$

Advantageously, the servers can perform forks and joins without involving clients. In particular, on joins, servers join the state, take the union of the sets J of joinable servers, and merge corresponding vector clocks (defined as taking the pointwise maximum), as follows:

$$\text{FORK}(s_1, s_2): \frac{s_2 \notin domR \quad f(\sigma) = (\sigma_1, \sigma_2) \quad J' = J \cup \{s_2\}}{R(s_1 \mapsto (\sigma, J, L)) \to R[s_1 \mapsto (\sigma_1, J, L')][s_2 \mapsto (\sigma_2, J, L)]} \quad \text{Eqn. (9)}$$

$$\text{JOIN}(s_1, s_2): \frac{s_2 \notin J_1 \quad \sigma' = j(\sigma_1, \sigma_2) \quad J' = J_1 \cup J_2 \quad L' = \text{merge}(L_1, L_2)}{R(s_1 \mapsto (\sigma_1, J_1, L_1))(s_2 \mapsto (\sigma_2, J_2, L_2)) \to R[s_1 \mapsto (\sigma', J', L')][s_2 \mapsto \bot]} \quad \text{Eqn. (10)}$$

Again, Theorem 1 can be used to reason that finite executions of this system are eventually consistent (for infinite executions additional fairness guarantees are used, as discussed below). Again, all states σ stored in R correspond to terminals in a revision diagram and are manipulated according to the rules discussed above. In this case, the join condition is satisfied because of the following invariants:

1. If the set J of server $s_1$ contains $s_2$, then $s_1$'s terminal is reachable from the fork vertex that forked $s_2$'s revision; and
2. If L(c)=n for server s, and client c's transaction counter is n, then the terminal of s is reachable from the fork vertex that forked c's revision.

Note that since the transition rules described above do not contain any guarantees that force servers to synchronize with each other, it is theoretically possible to construct "infinite" executions that violate eventual consistency. Consequently, actual implementations of the Eventually Consistent Sharing Model can be implemented in a manner that adds a mechanism to guarantee that updates eventually reach the primary or main revision, and that clients that perform an "infinite" sequence of transactions receive versions from the main revision often.

2.3 Composable Data Types for Eventual Consistency:

In a "cloud computing" scenario, the Eventually Consistent Sharing Model described above is further adapted using "composable data types" in order to provide eventual consistency for shared revisions of data, as described in further detail below.

As is well known to those skilled in the art, writing programs or applications for mobile devices that share structured data through the cloud and use eventually consistent local replicas for offline operation is a challenging problem. Implementing all components of such programs can be surprisingly complex even for simple examples (like a shared grocery list). The challenges include repetitive engineering aspects (e.g., communication protocols, local persistence, cloud storage, etc.) as well as data consistency issues caused by concurrent updates and multi-master replication.

To simplify the programming of such applications, the Eventually Consistent Sharing Model described above is further adapted to use a relational data model based on composable cloud data types that provide eventual consistency and integrates seamlessly into whatever programming language is being used to code the applications. Advantageously, this relational data model can be integrated into existing programming languages in a way that "hides" storage and communication details (e.g., servers, networks, caches, etc.) and lets programmers focus on the essentials (e.g., simply declaring and accessing data).

The following paragraphs demonstrate: (1) how programs can be expressed with ease using the composable data types of the Eventually Consistent Sharing Model, and (2) how to implement a system supporting this model by describing an exemplary prototype consisting of a cloud service and a mobile client library that achieves eventual consistency by construction.

Downloadable applications that offer specialized functionality on a mobile device (so-called "apps") are becoming increasingly popular. Moreover, as the use of multiple devices within a social context becomes more prevalent, such applications often form a distributed system whose components include devices such as mobile phones, tablets, PCs, etc., as well as web services and storage hosted in the cloud.

A common requirement for apps is to store structured and persistent data that is replicated across multiple devices of a single user, between devices of multiple users, or between some combination thereof. For example, a simple shared grocery list can help family members keep track of items to be purchased on the next trip to the store. Other simple examples include user preferences, calendars, contact lists, personal music databases, etc.

Another common requirement is that apps remain functional and responsive even when the connection to the cloud is unreliable, slow, or temporarily unavailable. A common solution is to maintain a replica of the data on each device. Therefore, this replica can be always available for queries and updates, even if the device is disconnected. Then, when reconnected, updates are propagated to all other replicas in such a way that the resulting data is eventually consistent even in the presence of conflicting (non-commutative) updates.

Even though many existing technologies to implement such apps are readily available to developers, it can be extremely complex to assemble all the required components, even for simple apps such as the grocery list. In particular using conventional methods, the following complex issues are typically addressed by the developer when coding such apps:

Representation. Because app programming is at the intersection of historically separate communities (e.g., databases, networking, web programming, object-oriented programming, etc.) programmers often end up writing and maintaining inordinate amounts of code to translate between different data representations (e.g., SQL, HTTP, JSON, XML, object heaps, etc.). App programmers may even be forced to write custom web services, and may have to deal with subtle programming platform differences between clients and servers.

Consistency. Since multiple devices can update their local replicas at the same time while disconnected, clients can detect conflicts only after the fact, when sending changes to the server. When such transactions fail, one must write code explicitly to resolve the conflict. For example, if several users update the same entry in a grocery list, the code must be designed to ensure that updates are not lost.

Change sets. Support for disconnected operation typically means that an app must store not just a local replica, but also log a delta of all the updates that are performed locally. Then, when the device is reconnected, these are the updates that are now sent to the server replica. Reliably resolving conflicting operations inside a large change set can be a difficult problem.

Given these challenges, it is not surprising that many apps do not fully implement eventual consistency. For example, in many conventional apps, updates can only be performed while connected, and the app blocks while the transaction takes place. Other conventional apps do allow non-blocking updates but do not guarantee eventual consistency, etc.

As discussed in further detail below, the Eventually Consistent Sharing Model is further adapted using composable data types to provide a simple relational model for sharing structured and composable data between devices and servers while guaranteeing eventually consistent online or off-line operation. The solution provided by the Eventually Consistent Sharing Model can also be integrated into arbitrary programming languages, thereby allowing recurring engineering complexities such as dealing with connectivity to servers, the consistency protocol, local persistence, and conflict resolution, etc., to be "hidden" within the programming platform. In other words, the techniques described below can be integrated into the programming language to provide automated eventual consistency techniques that allow the programmer to simply declare app data structures and write client code that accesses those data structures without needing to address the complexities of manually addressing such issues.

In general some of the advantageous features of the Eventually Consistent Sharing Model in a cloud computing scenario include, but are not limited to, the following:

Complete language integration. In various embodiments, some or all aspects of the data model (e.g., declarations, queries, and updates) provided by the Eventually Consistent Sharing Model are integrated directly into any arbitrary programming language. Advantageously, this allows the developer to code a program that uses a single data format that allows the code to read or modify the data directly, without buffering or copying. In other words, many existing programming languages can be easily extended or adapted to directly provide support for the Eventually Consistent Sharing Model, or can simply use libraries (e.g., DLL's) to expose the functionality of the Eventually Consistent Sharing Model to the developer.

Automatic sharing and persistence. The declared data of the Eventually Consistent Sharing Model is automatically shared between all devices, and is automatically persisted both on local storage as well as in cloud or network storage. Note that for purposes of explanation, conventional session and authorization management techniques are omitted as they can be dealt with separately.

Server code not required. Although cloud servers are used to maintain consistency, the app developer does not need to write or include any code that executes on the server. The data declarations (and in particular, the various "cloud types" described herein) completely determine the functionality of the server.

Reliable automatic conflict resolution. Conflict resolution is performed automatically (both on the server and locally on each client device) based on the schema provided by the Eventually Consistent Sharing Model. This conflict resolution never fails, so there is no need for special error handling code.

Eventual Consistency. Replicas are guaranteed to be eventually consistent.

In particular, as discussed above, the Eventually Consistent Sharing Model uses a definition of eventual consistency based on the theory of revision diagrams that provides a simple and provably correct way to build eventually consistent systems (see Section 2.2, above).

Flexible synchronization. The Eventually Consistent Sharing Model supports both a non-blocking weak synchronization primitive (i.e., "yield," as discussed throughout Section 2.2) that guarantees eventual consistency under disconnected operation, and a blocking synchronization primitive ("flush") that supports stronger consistency in a connected scenario.

Stateless servers. The Eventually Consistent Sharing Model provides a protocol that does not require servers to maintain state for clients indefinitely. Advantageously this allows client devices to arbitrarily disconnect for indefinite periods without prior warning, and always allows them to reconnect at any time and commit all the updates that were performed in the meantime.

The programming model provided by the Eventually Consistent Sharing Model brings together many different aspects of distributed system design based on the idea of using revision diagrams and fork-join "automata" (see the aforementioned co-pending U.S. Patent Application) to achieve eventual consistency. Advantageously, the data schema of the Eventually Consistent Sharing Model can be composed from basic "cloud types," which eliminates the need for user-defined conflict resolution code (see Section 2.3.1.5).

Note that the following discussion provides an exemplary comprehensive formal syntax and semantics as an example of one of a number of ways in which the Eventually Consistent Sharing Model can be implemented. This serves to connect a small, but sufficiently expressive programming language with a detailed operational model of a distributed system containing a server-pool and multiple client devices, as discussed in further detail (see Section 2.3.3). These models are connected by a fork-join automaton (an abstract data type supporting eventual consistency) derived automatically from the schema (see Section 2.3.4). Together, these models extend the advantageous uses of the eventually consistent transactions described in the aforementioned co-pending U.S. patent application.

2.3.1 Programming Model Overview:

The following paragraphs illustrate the programming model enabled by the Eventually Consistent Sharing Model in view of a series of examples interwoven with explanations. These examples begin with a simple grocery list, which introduces basic cloud types, cloud arrays, and use of the aforementioned yield primitive (see Section 2.3.1.1). An execution model (see Section 2.3.1.3) is then provided as an example that uses stronger synchronization, and that shows how to compose cloud types into relational schema including dynamic entities (Section 2.3.1.5).

Note that for purposes explanation, all examples discussed herein are provided in a pseudo-code using a typed JavaScript-like language. However, it should be understood that the features of the Eventually Consistent Sharing Model can be incorporated into most real-world static or dynamic languages in a seamless way. For example, various tested embodiments of the Eventually Consistent Sharing Model have been implemented directly in the TouchDevelop language and as a library in C#, though the Eventually Consistent Sharing Model is clearly not limited to these languages.

2.3.1.1 Introductory Example: Grocery List:

A simple but quite common scenario is the ever popular "grocery list" application found on many mobile devices. Pseudo-code for an exemplary grocery list application is illustrated below in Table 1, and described in detail below.

TABLE 1

Pseudo-Code for the "Grocery List" Example.

```
// declaration of cloud data
global TotalCount : CInt;
array Grocery[ name : String ]
{
  toBuy : CInt;
}
// operations representing user actions
function ToBuy( name : String, count : Int )
{
  TotalCount.add(count) ;
  Grocery[name].toBuy.add(count) ;
}
function Bought( name : String, count : Int )
{
  TotalCount.add(- count);
  Grocery[name].toBuy.add(- count);
}
function Display( )
{
  foreach g in entries Grocery.ToBuy
  {
    Print(g.toBuy.get( ) + " " + g.name);
  }
  Print(TotalCount.get( ) + " total");
}
// main event loop
function main( )
{
  bool done = false;
  while (not done)
  {
    yield( ); //allow send/receive of updates
    match (NextUserCommand( )) with
    {
      buy s n:
        ToBuy(s, n);
      bought s n:
        Bought(s, n);
      display:
        Display( );
      quit:
        done = true;
    }
  }
}
```

First, consider the cloud data declarations in Table 1. Note that the term "cloud data" is used herein to emphasize that the data declared is automatically replicated across all devices. For this example, both (1) a count of the total groceries to buy, and (2) a count for each individual grocery item are stored. Although not particularly important for this example, storing the total count is helpful to illustrate the consistency model.

As illustrated in Table 1,, to represent the total count, a variable called TotalCount of type "CInt" (i.e., "Cloud Integer") is declared. This type is a primitive data type for storing and manipulating cloud integers. It differs from ordinary integer variables in that it offers higher level operations that have better conflict resolution semantics than using get and set operations alone. In particular, it offers an add operation to express a relative change, reminiscent of atomic or interlocked instructions in shared-memory programming.

To represent the quantity of each item, a "cloud array" called Grocery is used. The array is indexed by the name of the grocery item, and each entry stores the quantity "toBuy." This quantity is again of type CInt.

"Cloud arrays" differ from standard arrays, as the index type can be infinite (as in this case, strings). Cloud array entries can have multiple fields, although there is only one in this example (i.e., toBuy). Moreover, all array entries are always defined, and it is guaranteed that all fields are initialized with the default value (which is 0 for CInt).

Next, consider the actions on the data in Table 1:

ToBuy: When adding (count) items of name (name), both the total (TotalCount) as well as the specific item count stored in the array are adjusted using the primitive (add) which is supported by the cloud integer type CInt. The array entry is accessed using the name of the cloud array (Grocery) and an index ([name]) and field (toBuy).

Bought: Removing items from the list proceeds as above, except that the quantity is subtracted rather than added.

Display: The list is displayed by iterating over the array. In particular, the system iterates over (entries Grocery.ToBuy), which returns only array entries for which the field (toBuy) is not the default value (0 for CInt). Thus, the name and the count of all items for which the count is not zero is printed, as illustrated by the Print command in Table 1.

Finally, consider the pseudo-code for the "main event loop" in Table 1. Since the grocery list is an interactive program, it executes some form of loop to handle user commands. In a realistic event-based application framework, the API is likely to be different; however, the simple loop presented above should be sufficient to convey the idea for purposes of explanation. The interesting part is the "yield" statement in the main event loop. In particular, the yield statement gives the runtime system the permission to both: (1) propagate changes made locally to the replica to other devices; and (2) apply changes made by other devices to the local replica. As discussed above throughout Section 2.2, yield is non-blocking. It is also guaranteed to execute very quickly. Further, yield does not force synchronization, and it is therefore acceptable for yield to do nothing at all (which is in fact all it can do in situations where the client device is not connected to the cloud).

Another way to describe the effect of yield is that the absence of a yield guarantees isolation and atomicity; yield statements thus partition the execution into a form of transaction that is referred to herein as an "eventually consistent transaction." Effectively, this implies that everything is always executing inside a transaction. The resulting atomicity is useful for maintaining invariants. In particular, in this example, it guarantees that the total count is always equal to the sum of all the individual counts, since all changes made to (Grocery) and (TotalCount) are applied atomically.

2.3.1.2 Revision Diagrams and Cloud Types:

In view of the basic language features discussed above, the execution model of the Eventually Consistent Sharing Model can now be described in more detail. Note that the semantics below are based on concurrent revisions as discussed in the aforementioned co-pending patent application, and rely on the following main concepts:

Revision diagrams: As discussed in Section 2.2, revision diagrams show the order in which revisions are forked and joined. Conceptually, each revision keeps a log of all the updates that were performed in it. When a revision is joined into another revision, it replays all logged updates into that revision.

Cloud types: Cloud types (e.g., integers, strings, booleans, arrays, entities, etc., that are adapted to cloud computing environments) are abstract data types that offer a precisely defined collection of update and query operations. Moreover, cloud types can provide optimized fork and join implementations and space-bounded representations of logs. See Section 2.3.4 below for a detailed discussion of cloud type implementations.

Figure 6:
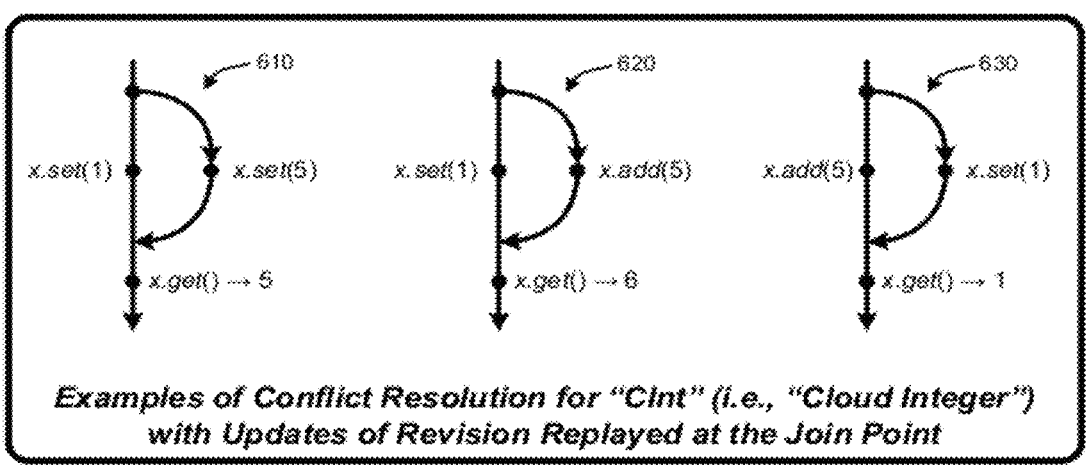
FIG. 6 provides examples of conflict resolution for a "cloud integer" data type with updates of revisions replayed at join points, as described herein.

For example, consider a cloud variable x of type CInt and the revision diagram examples in FIG. 6. In particular, FIG. 6 illustrates conflict resolution for CInt, and shows that updates of the revision are replayed at the join point. Note that join is not symmetric. In particular, join orders updates of the joined revision after the updates of the joining revision, and update operations are not always commutative. For example, add operations (revision diagrams 620 and 630) do commute, but set operations (revision diagram 610) do not commute.

2.3.1.3 Execution Model and Eventual Consistency:

In view of the preceding discussion, revision diagrams (or corresponding software or program module constructs such as fork-join automata) can be employed to build an eventually consistent distributed system. The idea is to keep the primary or main revision on the server (or on some centralized computer accessible to each client), and to keep some revision always available on each device, whether connected or not. Advantageously, revisions may be sent from the server to clients, and vice versa, and forks and joins may be performed on either one.

Program execution is nondeterministic if multiple client devices are involved. In particular, determinism makes no sense for eventually consistent systems, since such systems are expected to adapt opportunistically to unpredictable message latency and loss.

Forking and joining of revisions on the server is straightforward. The implementation of yield on each device is guaranteed to always execute quickly and never block (regardless of message speed or lost messages). This is achieved by distinguishing between three cases (referred to as Cases A, B, and C):

Case A. If a server response is not currently expected, the device (i.e., the client) sends the current revision to the server, and forks a new revision for continued local use;

Case B. If a revision from the server has arrived at a device, the current local revision is merged (i.e., joined) into the received revision; and Case C. If a revision is expected from the server but it is not currently available or present, the device does not merge or fork revisions.

Figure 7:
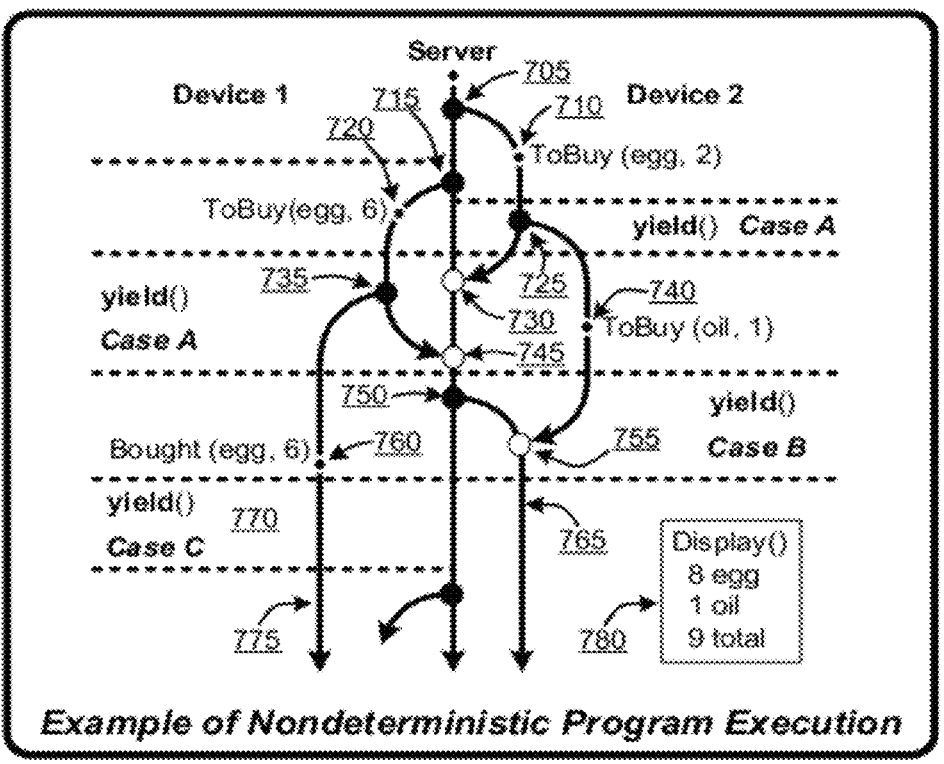
FIG. 7 provides an example of a nondeterministic program execution scenario, as described herein.
Figure 8:
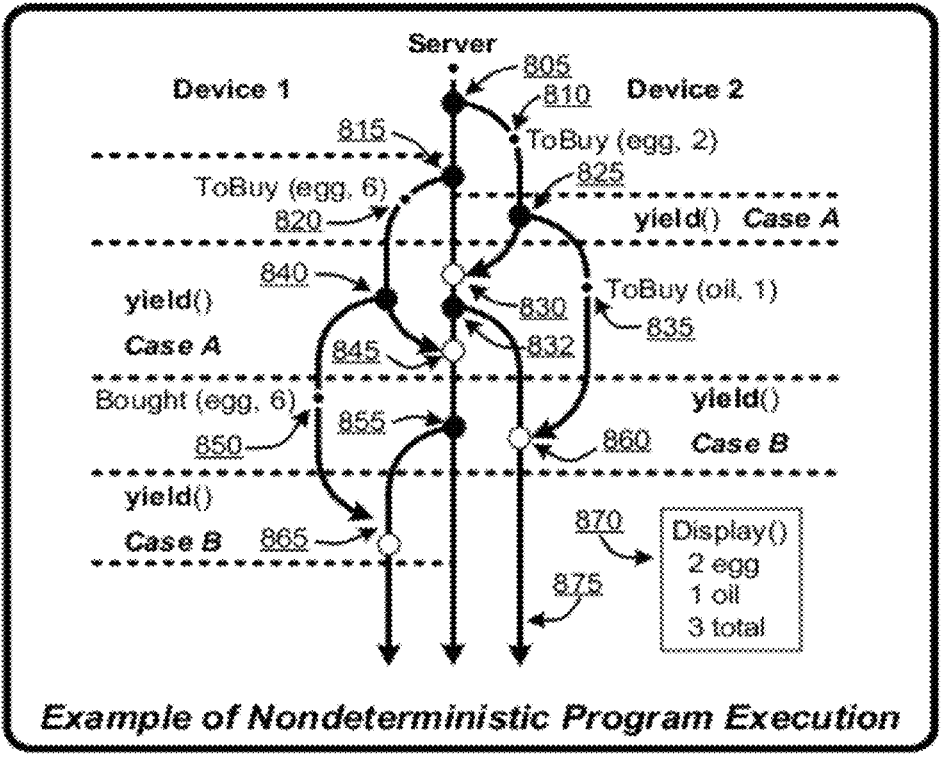
FIG. 8 provides an example of a nondeterministic program execution scenario, as described herein.

The revision diagrams illustrated in FIG. 7 and FIG. 8 represent possible executions of the aforementioned grocery list example for the case of two devices and one server, where Device 1 and Device 2 are sharing a grocery list that can be changed or updated by either or both devices at any time. Note that in both FIG. 7 and FIG. 8, each device (i.e., "Device 1" and "Device 2" perform the same actions, but with different timing. However, because of simple timing differences, the Display( ) on Device 2 may either see the first update by Device 1, as illustrated by FIG. 7, or not see it, as illustrated by FIG. 8.

More specifically, in view of yield implementation cases A, B and C, as described above, an examination of the revision diagram of FIG. 7 shows the following sequence of events:

1. Server forks 705 its current revision of an empty grocery list to Device 2;
2. Device 2 updates 710 its current revision by adding 2 eggs to the grocery list just received from the server;
3. Server forks 715 its current revision of the empty grocery list to Device 1;
4. Device 1 updates 720 its current revision by adding 6 eggs to the grocery list just received from the server;
5. Device 2 is not currently expecting a server response, so, per yield "Case A," Device 2 forks 725 a new revision of the grocery list to itself and sends its current revision to the server which merges 730 the revision provided by Device 2 to its own current revision, with the result that the server now holds a current revision of the grocery list having 2 eggs;
6. Device 1 is not currently expecting a server response, so, per yield "Case A," Device 1 forks 735 a new revision of the grocery list to itself and sends its current revision to the server which merges 745 the revision provided by Device 1 to its own current revision, with the result that the server now holds a current revision of the grocery list having 8 eggs (i.e., 2 eggs added by Device 2 and 6 eggs added by Device 1);
7. Device 2 updates 740 its current local revision by adding 1 oil to its current revision of the grocery list. Since the current revision held by Device 2 includes only 2 eggs, this update creates a current revision for Device 2 wherein the grocery list includes 2 eggs and 1 oil;
8. Server then forks 750 its current revision of the grocery list (which only includes 8 eggs—see step 6 above) to Device 2;
9. Device 2 merges 755 its current local revision to the revision just received from the server. Therefore, per yield "Case B," since the current revision held by Device 2 includes 2 eggs and 1 oil and the revision just received from the server includes 8 eggs (two of which were previously added by Device 2) this merge creates a current revision 765 for Device 2 wherein the grocery list includes 8 eggs and 1 oil;
10. In the meantime, Device 1 updates 760 its current revision to indicate the purchase of 6 eggs, with the result that the current revision of the grocery list held by Device 1 is empty (i.e., remove the 6 eggs purchased from the 6 eggs on the previously current list).
11. However, per yield "Case C," 770, since Device 1 is expecting a revision from the server (but it has not yet been received, as illustrated), Device 1 does not merge or fork revisions at this time.
12. Consequently, a Display( ) 780 of the current revision 765 of the grocery list held by Device 2 will still include 8 eggs and 1 oil until such time as further updates, forks, or merges occur.

Interestingly, in view of yield implementation cases A, B and C, as described above, different Display( ) results will be held by Device 2 even where the same actions occur (i.e., Device 1 adds 6 eggs then purchases 6 eggs, and Device 2 adds 2 eggs then adds 1 oil), but with different timings for those actions. In particular, an examination of the revision diagram of FIG. 8 shows the following sequence of events:

1. Server forks 805 its current revision of an empty grocery list to Device 2;
2. Device 2 updates 810 its current revision by adding 2 eggs to the grocery list just received from the server;
3. Server forks 815 its current revision of the empty grocery list to Device 1;
4. Device 1 updates 720 its current revision by adding 6 eggs to the grocery list just received from the server;
5. Device 2 is not currently expecting a server response, so, per yield "Case A," Device 2 forks 825 a new revision of the grocery list to itself and sends its current revision to the server which merges 830 the revision provided by Device 2 to its own current revision, with the result that the server now holds a current revision of the grocery list having 2 eggs;
6. Device 2 updates 835 its current local revision by adding 1 oil to its current revision of the grocery list. Since the current revision held by Device 2 includes only 2 eggs, this update creates a current revision for Device 2 wherein the grocery list includes 2 eggs and 1 oil;
7. The server then forks 832 its current revision (grocery list having 2 eggs) to Device 2;
8. Device 1 is not currently expecting a server response, so, per yield "Case A," Device 1 forks 840 a new revision of the grocery list to itself and sends its current revision to the server which merges 845 the revision provided by Device 1 to its own current revision, with the result that the server now holds a current revision of the grocery list having 8 eggs (i.e., 2 eggs added by Device 2 and 6, eggs added by Device 1);
9. Device 1 then updates 850 its current revision to show the purchase of 6 eggs, with the result that the current revision of the grocery list held by Device 1 is empty (i.e., remove the 6 eggs purchased from the 6 eggs on the previously current list);
10. Server then forks 855 its current revision of the grocery list (which only includes 8 eggs—see step 7, above) to Device 1;
11. Device 2 then merges 860 its current local revision to the revision earlier received from the server (i.e., grocery list having 2 eggs added by Device 2, see step 7). Therefore, per yield "Case B," since the current revision held by Device 2 includes 2 eggs and 1 oil, the merged current revision 875 for Device 2 will still include 2 eggs and 1 oil.
12. Device 1 then merges 865 its current local revision to the revision previously received from the server (i.e., grocery list having 8 eggs—see step 10). Therefore, per yield "Case B," since the current revision held by Device 1 is empty, the merged current revision for Device 1 will include 2 eggs (i.e., the 8 eggs on the revision received from the server less the 6 eggs previously removed from the list (see steps 8 and 9 above).
13. In the meantime, per yield "Case B," Device 2 merges 860 its current revision (i.e., 2 eggs and 1 oil), with the current revision just received from the server (see step 8, above).
14. Consequently, a Display( ) 870 of the current revision 875 of the grocery list held by Device 2 will still include 2 eggs and 1 oil until such time as further updates, forks, or merges occur.

Advantageously, even with temporary differences in revisions between devices or servers, as long as clients (i.e., the devices) repeatedly call yield, and as long as messages are eventually delivered (using retransmission if necessary), eventual consistency between all devices and servers is achieved. Note that an example of formal operational semantics for yield is provided below in Section 2.3.3.

Since revision diagrams are quite general, a wide variety of implementation choices beyond the ones described herein can be employed (such as servers organized as trees, or clients bundled with servers connected peer-to-peer). Note that an example of one of many possible multi-server implementation models (i.e., a server pool) is described in detail below in Section 2.3.3.

2.3.1.4 Mutual Exclusion Example: Seat Reservation

Sometimes, conventional eventual consistency techniques are too weak. For example, consider an application making seat reservations, which may attempt something like the following:

```
array Seat [ row : int, letter : string ]
{
    assignedTo : CString;
}
function NaiveReserve(seat: Seat, customer : string)
{
    if (seat.assignedTo.get( ) == " ")
        seat.assignedTo.set(customer);
    else
        print("reservation failed");
```

Unfortunately, in a conventional eventual consistency scenario, this type of application does not work as desired. In particular, a seat may appear empty in a local revision, but may already be filled on the server. In this case, the NaiveReserve function illustrated above would appear to succeed on the local device, but in fact may overwrite another reservation once the update reaches the server. Advantageously, the Eventually Consistent Sharing Model addresses this issue by introducing a primitive operation that is referred to herein as "setIfEmpty" for the cloud type "CString." This operation sets the string only if it is currently empty, and this condition is reevaluated when the update operation is applied on the server. Thus, existing reservations are never overwritten.

However, yield is still not sufficient to force mutual exclusion, since it is uncertain when the update has reached the server. Thus, the Eventually Consistent Sharing Model supports an additional synchronization primitive called flush. Upon flush, execution blocks until:

1. All local updates have been applied to the main revision; and
2. The result has become visible to the local revision.

Therefore, by using the primitive called flush, the body of the above-described reservation function can be implemented as follows:

```
seat.setIfEmpty(customer);
flush;
if (seat.get( ) ≠ customer) print("reservation failed");
```

Since flush could block indefinitely if the device is not connected, various embodiments of the Eventually Consistent Sharing Model support the additional specification of a timeout. As such, it should be clear that the flush primitive enables a wide range of advanced synchronization scenarios (clearly not limited to seating assignments) when combined with yield. Further, the example provided above demonstrates that the Eventually Consistent Sharing Model is at least as expressive as shared-memory programming with locks, since locks can be implemented analogously.

However, locks are not a good programming technique in these scenarios, since devices may become disconnected without warning. As such, it should be clear that the Eventually Consistent Sharing Model provides a number of advantageous sharing capabilities, especially in the case where devices may become disconnected from the server at any time and without warning.

2.3.1.5 Advanced Example: Relational Database

In various embodiments, the Eventually Consistent Sharing Model also provides various techniques for storing complex relational data using various cloud types, including CString (i.e., "cloud string"), CTime (i.e., "cloud time"), CInt (i.e., "cloud integer"), etc. An example of a mobile application that maintains a database of customers and orders using these various cloud types is described below, with exemplary Pseudo-code for such an application illustrated below in Table 2.

TABLE 2

Pseudo-Code for the Customer Database Example.

```
entity Customer
{ name : CString }
array Product[ id : string ]
{ name : CString, price : CInt }
entity Order(customer : Customer)
{ time : CTime, totalprice : CInt }
array CartItem [ customer : Customer, product : Product ]
{ quantity : CInt }
array OrderItem [ order : Order, product : Product ]
{ quantity : CInt, price : CInt }
function AddToCart(c: Customer, p: Product, q: int)
{ CartItem[c,p].quantity.add(q) }
function DeleteCustomer(c: Customer)
{ delete c }
function SubmitOrder(customer : Customer)
{
    // create fresh order
        var order = new Order(customer)
        order.time.set(now( ))
    // move items from cart
        foreach cartitem in entries CartItem.quantity
            where cartitem.customer == customer
        {
            var oitem = OrderItem[order, cartitem.product]
            oitem.quantity = cartitem.quantity
            oitem.price = cartitem.quantity * cartitem.product.price
            cartitem.quantity.add(-oitem.quantity)
            order.totalprice.add(oitem.price)
        }
}
function ShowOrders(customer : Customer)
{
    foreach order in all Order
        where order.Customer == customer
        orderby order.time
    {
        Print(" Order of " + order.time)
        foreach(i in all OrderItem)
            where i.order == order
        {
            Print(i.quantity + " " + i.product.name + " for " + i.price)
        }
    }
}
```

Since typical arrays do not support dynamic creation or deletion of entries, the Eventually Consistent Sharing Model provides an alternative form of data structure, referred to herein as "entities." Note that both arrays and entities, as described herein, differ from the conventional idea of entities in that array entries of the Eventually Consistent Sharing Model have visible primary keys (the indexes), and cannot be created or deleted. Further, the entities of the Eventually Consistent Sharing Model have hidden, automatically managed primary keys, and are explicitly created and deleted by the user. In the example pseudo-code of Table 2, customers and orders are modeled as entities rather than array entries, which has two advantages: (1) they can be created without first determining an index by which to identify them uniquely, and (2) they can be explicitly deleted, which removes them (as well as all associated data) from the database. Below are additional definitions and considerations regarding the contents of Table 2.

Product is an array of products, indexed by a unique id;

CartItem is an array of cart items, indexed by customers and products, storing the quantity;

The entity Order takes a customer as a construction argument (construction arguments are like immutable fields, but also play an additional role explained below);

The array OrderItem stores the quantity of each product in each order;

The function AddToCart adds items to a customer's cart, just items were items to the grocery list in the previous example;

The function SubmitOrder creates a new order entity for the customer, then iterates through the cart items of this customer, and adds them to the order, totaling the prices. Note that since there is no yield in this function, it is not necessary to consider the order entity becoming visible to other devices before all of its information is computed;

The function ShowOrders prints all orders by a customer, sorted by date. It uses the query "all Order where order.Customer=order" which returns all order entities belonging to this customer; and The function DeleteCustomer is simple, but has some interesting effects. Not surprisingly, it deletes the customer entity. However, beyond that, it also clears all entries in all arrays that have the deleted customer as an index, and it even deletes all orders that have the deleted customer as a construction argument. Entities whose existence depends on other entities are sometimes called 'weak entities' in the literature. However, with respect to the Eventually Consistent Sharing Model, those 'weak entities' correspond to: (1) entities that have other entities appearing in their construction arguments, and (2) array entries that have entities appearing as an index.

2.3.2 Syntax, Types, and Local Semantics:

Table 3, below, describes the syntax of types, schemas, and expressions used by the Eventually Consistent Sharing Model. Note that in the following discussion and in Table 3, a subscript n without an explicit bound is assumed to be n≥0. The Eventually Consistent Sharing Model distinguishes kinds of types:

1. An index type "$\iota$" is the type of values that can be used as indices into an array or entity, and consists of simple read-only values like Int, String, and array, and entity identifiers (A and E);
2. A cloud type "$\omega$" is used for mutable cloud values that are persisted. These types are prefixed with the letter C (e.g., "CString" for a cloud string type) to distinguish them from regular value types. Examples of cloud types include CInt and CString, as noted above. Note that Section 2.3.4 provides precise semantics for these cloud values using fork-join automata to enable various embodiments of the Eventually Consistent Sharing Model;
3. A type CSet $\langle \iota \rangle$ is a type of observe-remove set;
4. Finally, the Eventually Consistent Sharing Model provides regular expression types $\tau$ which includes index types $\iota$, functions, products, and regular sets.

A schema S consists of a sequence of declarations. A declaration is either an array A, an entity E, or a property p. Properties map an index $\iota$ to a mutable cloud type $\omega$. In the examples described herein examples, the following "syntactic sugar" (i.e., syntax within a programming language that is designed to make things easier to read or to express) is used define properties as part of an array or entity declaration:

entity $E(k_1:\iota_1, \ldots, k_m:\iota_m)\{p_1:\omega_1, \ldots, p_n:\omega_n\}$≡entity $E(k_1:\iota_1, \ldots, k_m:\iota_m)$; property $p_1: E\to\omega_1; \ldots$; property $p_n:E\to\omega_n$ array $A[k_1:\iota_1, \ldots, k_m:\iota_m]\{p_1:\omega_1, \ldots, p_n:\omega_n\}$≡ $A[k_1:\iota_1, \ldots, k_m:\iota_m]$; property $p_1: A\to\omega_1; \ldots$; property $p_n: A\to\omega_n$ Also, global persisted values (as used, for example, in the grocery list pseudo-code provided in Table 1, above) are syntactic sugar for cloud arrays without any keys and a single value property:

global $x:\omega$≡array $x[\ ]\{value:\omega\}$ where all operations on x are replaced with operations on the array value:

$x.op(e_1, \ldots, e_n)$≡$x[\ ].value.op(e_1, \ldots, e_n)$

TABLE 3

Syntax of Types, Schemas, and Expressions.

| | | | | |
|---|---|---|---|---|
| entity names | Ent∋ | E | ::= | ... |
| array names | Arr∋ | A | ::= | ... |
| index types | | $\iota$ | ::= | Int \| String \| E \| A |
| cloud types | | $\omega$ | ::= | CInt \| CString \| CSet$\langle\iota\rangle$ \| ... |
| expression types | | $\tau$ | ::= | $\iota$ \| Set$\langle\tau\rangle$ \| $\tau \to \tau$ \| $(\tau_1,...,\tau_n)$ |
| key names | | k | ::= | ... |
| property names | | p | ::= | ... |
| declarations | | decl | ::= | entity $E(k_1:\iota_1,...,k_n:\iota_n)$ |
| | | | \| | array $A[k_1:\iota_1,...,k_n:\iota_n]$ |
| | | | \| | property $p : \iota \to \omega$ |
| schema | | $S$ | ::= | $decl_1;...;decl_n$ |
| unique id's | Uid∋ | uid | ::= | ... (abstract) |
| constants | Con∋ | c | ::= | ... (integer and string literals) |
| updates | | $op_u$ | ::= | ... (predefined) |
| queries | | $op_q$ | ::= | ... (predefined) |
| operations | | op | ::= | $op_u$ \| $op_q$ |
| values | Val∋ | v | ::= | $A[v_1,...,v_n]$\|$E[uid,v_1,...,v_n]$ |
| | | | \| | c\|x\|$(v_1,...,v_n)$ \| $\lambda(x:\tau).e$ |
| expressions | | e | ::= | new $E(e_1,...,e_n)$ |
| | | | \| | delete e |
| | | | \| | $A[e_1,...,e_n]$ |
| | | | \| | $e.p.op(e_1,...,e_n)$ |
| | | | \| | e.k |
| | | | \| | all E |
| | | | \| | entries p |
| | | | \| | yield \| flush \| barrier |
| | | | \| | v \|$e_1\ e_2$ \| $e_1; e_2$ \| $(e_1,...,e_n)$ |
| program | program | | ::= | $S$ ;e |

The syntax of expressions is separated into values v and expressions e to facilitate the description of the evaluation semantics. Values can be regular values such as literals c, variables x, products of values, or lambda expressions. Moreover, the Eventually Consistent Sharing Model uses array and entity values that encode a particular entry of an array as $A[v_1, \ldots, v_n]$, or a particular entity as $E[uid,v_1, \ldots, v_n]$. Note that the entity value is not an expression that a user would write down themselves, and only occurs in the evaluation semantics as the result of a new expression (which also supplies the unique id uid for the entity value).

Expressions consist of both cloud specific expressions, and of regular expressions like applications $e_1$ $e_2$, sequence $e_1$; $e_2$, products, and lambda expressions. The keywords new and delete respectively create and delete entities. The expression $A[e_1, \ldots, e_n]$ is used to index into an array. The operation expression $e.p.op(e_1, \ldots, e_n)$ invokes an update or query operation op on a property p indexed by e. The creation keys of an entity, or the indices of an array expression, can be queried using the e.k expression.

The all and entries keywords return all elements of an entity or all non-initial entries of a property, respectively. These primitive expressions allow the Eventually Consistent Sharing Model to construct general queries. Finally, the yield and flush operations are used for synchronization with the cloud.

Table 4 defines an example of a type system for an expression language for implementing the Eventually Consistent Sharing Model. A derivation S, $\gamma e:\tau$ states that for a certain (well-formed) schema S and type environment Γ, the expression e is well-typed with a type τ. The initial Γ is written as $\Gamma_0$, and contains the type of primitive functions (i.e., add: (Int, Int)→Int), together with the types of primitive cloud type operations (i.e. CInt.add:(Int)→Unit).

Most rules are standard and self-explanatory. However, there are some details that should be noted. In particular, in the type rule for operation expressions, it can be seen that the type ω of the mutable cloud value never 'escapes'. In other words, values with a cloud type ω are not first-class and expressions always have a type τ (which does not include ω). This is by construction since an operation expression e.p. op($e_1, \ldots, e_n$) always occurs as a bundle and the cloud value never occurs in isolation.

2.3.2.1 Client Execution:

Table 5 and Table 6 give the evaluation semantics for local client execution. In particular, Table 5 defines the evaluation order within an expression. An execution context ε is an expression "with a hole, □", and the notation ε[[e]] is used to denote the expression obtained from ε by replacing the hole (i.e., "□") with e. Essentially, the execution context acts as an abstraction of a program counter and specifies where the next evaluation step can take place.

TABLE 5

Evaluation Contexts.

| | | |
|---|---|---|
| ε | ::= | □ |
| | \| | new $E(v_1,\ldots,v_i,\epsilon,e_j,\ldots,e_n)$ |
| | \| | delete ε |
| | \| | $A[v_1,\ldots,v_i,\epsilon,e_j,\ldots,e_n]$ |
| | \| | $\epsilon.p.op(e_1,\ldots,e_n)$ |
| | \| | $v.p.op(v_1,\ldots,v_i,\epsilon,e_j,\ldots,e_n)$ |
| | \| | ε.k |
| | \| | ε e\|v ε\|ε;e |
| | \| | $(v_1,\ldots,v_i,\epsilon,e_j,\ldots,e_n)$ |

Table 6 defines the operational semantics in the form of transition rules e;σ→e';σ' where an expression e with a local state σ is evaluated to a new expression e' and updated local state σ'. Note that the client state σ is the state of the schema fork-join automaton $\Sigma^S$, described below in Section 2.3.4.

TABLE 6

Expression Semantics.

| | | |
|---|---|---|
| ε[[new $E(v_1,\ldots,v_n)$]];σ | → | ε[[E[uid,$v_1,\ldots,v_n$]]]; σ.create$_E$(E[uid,$v_1,\ldots,v_n$]) (fresh uid) |
| ε[[delete E[uid,...]]];σ | → | ε[[( )]];σ.delete$_E$(uid) |

TABLE 4

Types of Expressions.

$$\frac{\text{Entity } E(k_1:\iota_1,\ldots,k_n:\iota_n) \in \mathcal{S} \quad \mathcal{S}, \Gamma \vdash e_i:\iota_i}{\mathcal{S}, \Gamma \vdash \text{new } E(e_1,\ldots,e_n):E} \qquad \frac{\mathcal{S}, \Gamma \vdash e:E \quad \mathcal{S}, \Gamma}{\mathcal{S}, \Gamma \vdash \text{delete } e: \text{Unit}}$$

$$\frac{\text{array } A(k_1:\iota_1,\ldots,k_n:\iota_n) \in \mathcal{S} \quad \mathcal{S}, \Gamma \vdash e_i:\iota_i}{\mathcal{S}, \Gamma \vdash A[e_1,\ldots,e_n]:A} \qquad \frac{\text{entity } E(\ldots) \in \mathcal{S}}{\mathcal{S}, \Gamma \vdash E[\text{uid}, v_1,\ldots,v_n]:E}$$

$$\frac{\mathcal{S}, \Gamma \vdash e:\iota \quad \text{property } p:\iota \to \omega \in \mathcal{S} \quad \omega.op:(\tau_1,\ldots,\tau_n)\to \in \Gamma \quad \mathcal{S}, \Gamma \vdash e_i:\tau_i}{(\mathcal{S}, \Gamma \vdash e.p.op(e_1,\ldots,e_n):\tau)}$$

$$\frac{\text{entity } E(\ldots) \in \mathcal{S}}{\mathcal{S}, \Gamma \vdash \text{all } E: \text{Set } \langle E \rangle} \qquad \frac{\mathcal{S}, \Gamma \vdash e:E \quad \text{entity } E(\ldots, k:\iota, \ldots) \in \mathcal{S}}{\mathcal{S}, \Gamma \vdash e.k:\iota}$$

$$\frac{\text{property } p:\iota \to \omega \in \mathcal{S}}{\mathcal{S}, \Gamma \vdash \text{entries } p: \text{Set } \langle \iota \rangle} \qquad \frac{\mathcal{S}, \Gamma \vdash e:A \quad \text{array } A(\ldots, k:\iota, \ldots) \in \mathcal{S}}{\mathcal{S}, \Gamma \vdash e.k:\iota}$$

$$\frac{x:\tau \in \Gamma}{\mathcal{S}, \Gamma \vdash x:\tau} \qquad \frac{\mathcal{S}, (\Gamma, x:\tau_1) \vdash e:\tau_2}{\mathcal{S}, \Gamma \vdash \lambda(x:\tau_1).e:\tau_1 \to \tau_2}$$

$$\frac{\mathcal{S}, \Gamma \vdash e_1:\tau_2 \to \tau \quad \mathcal{S} \Gamma \vdash e_2:\tau_2}{\mathcal{S}, \Gamma \vdash e_1 e_2:\tau} \qquad \frac{\mathcal{S}, \Gamma \vdash e_i:\tau_i}{\mathcal{S}, \Gamma \vdash (e_1,\ldots,e_n):(\tau_1,\ldots,\tau_n)}$$

$$\frac{\mathcal{S}, \Gamma \vdash e_1:\tau_1 \quad \mathcal{S}, \Gamma \vdash e_2:\tau_2}{\mathcal{S}, \Gamma \vdash e_1;e_2:\tau_2} \qquad \overline{\mathcal{S}, \Gamma \vdash \text{yield:Unit}}$$

TABLE 6-continued

Expression Semantics.

| | | |
|---|---|---|
| $\epsilon[[v.p.op_u(v_1,...,v_n)]];\sigma$ | $\rightarrow$ | $\epsilon[[(\ )]]\sigma.update_p(v,op_u(v_1,...,v_n))$ |
| $\epsilon[[v.p.op_q(v_1,...,v_n)]];\sigma$ | $\rightarrow$ | $\epsilon[[\sigma.querry_p(v,op_q(v_1,...,v_n))]];\sigma$ |
| $\epsilon[[all\ E]];\sigma$ | $\rightarrow$ | $\epsilon[[\sigma.all_E]];\sigma$ |
| $\epsilon[[entries\ p]];\sigma$ | $\rightarrow$ | $\epsilon[[\sigma.entries_p]];\sigma$ |
| $\epsilon[[A[v_1,...,v_n].k_i]];\sigma$ | $\rightarrow$ | $\epsilon[[v_i]];\sigma$ |
| $\epsilon[[E[uid,v_1,...,v_n]]];\sigma$ | $\rightarrow$ | $\epsilon[[v]];\sigma$ |
| $\epsilon[[(\lambda(x:t).e)v]];\sigma$ | $\rightarrow$ | $\epsilon[[e[v/x]]];\sigma$ |
| $\epsilon[[v;e]];\sigma$ | $\rightarrow$ | $\epsilon[[e]];\sigma$ |

The first three rules illustrated in Table 6, i.e., new, delete, and operation expressions (op), update the local state by invoking the corresponding updates on the fork-join automaton. The following three query rules return the result of executing the corresponding query on the fork-join automaton. Note that the fresh uid for the create call is produced locally since it is assumed that each client can generate such globally unique ids. However, in the case that a client is not capable of this operation for any reason, the Eventually Consistent Sharing Model can instruct the server (or server pool) to provide a globally unique id for any client.

The final four rules provided in Table 7 are standard evaluation rules on the expressions and do not use the local state at all. Note that in various embodiments, the creation keys of arrays and entities are maintained explicitly in the value representation, which makes the key selection a completely local operation. However, realistic implementations can use just the uid to represent entities and store the creation values in the local state (and similarly for arrays), if desired.

The operations yield, flush, and barrier cannot be described as local operations and are handled by the semantic rules defined over the clients and servers as discussed in detail below.

2.3.3 System Model and Distribution:

In the previous section, the local execution semantics of expressions were established and described in detail. The following discussion presents an example of an operational whole-system model including multiple clients and an elastic server pool. This example illustrates an eventually consistent system by ensuring that all executions produce proper revision diagrams, and that proper fork and join functions are used to manage the state of replicas.

Figure 9:
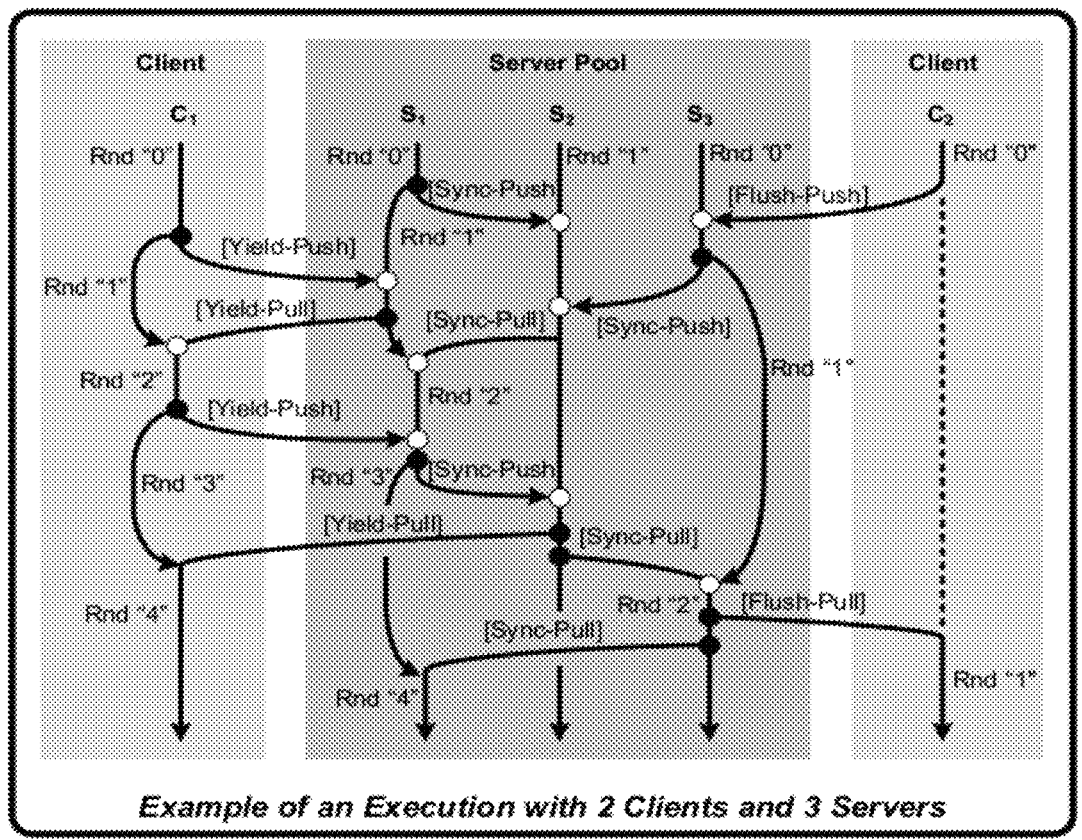
FIG. 9 provides an example of a nondeterministic program execution scenario in a case having two clients and a server pool of three servers (also referred to as "hosts"), as described herein.

In particular, FIG. 9 shows a brief example of an execution with three servers in a server pool (i.e., $S_1$, $S_2$, and $S_3$) and two clients (i.e., $C_1$, and $C_2$). Clients that perform yield or flush initiate transitions of two kinds, i.e., "push" and "pull" (thus initiating one of the four following transitions: 1) "Yield-Push", 2) "Yield-Pull", 3) "Flush-Pull", and 4) "Flush-Pull"). These transitions communicate with an eligible server in the pool. However, as explained in further detail below, not all servers are eligible at any particular point in time. In general, servers behave similarly to clients, initiating push and pull transitions with other eligible servers. However, between servers, Sync-Pull and Sync-Push transitions are used instead of the Yield-Pull and Yield-Push transitions initiated by the clients.

Figure 10:
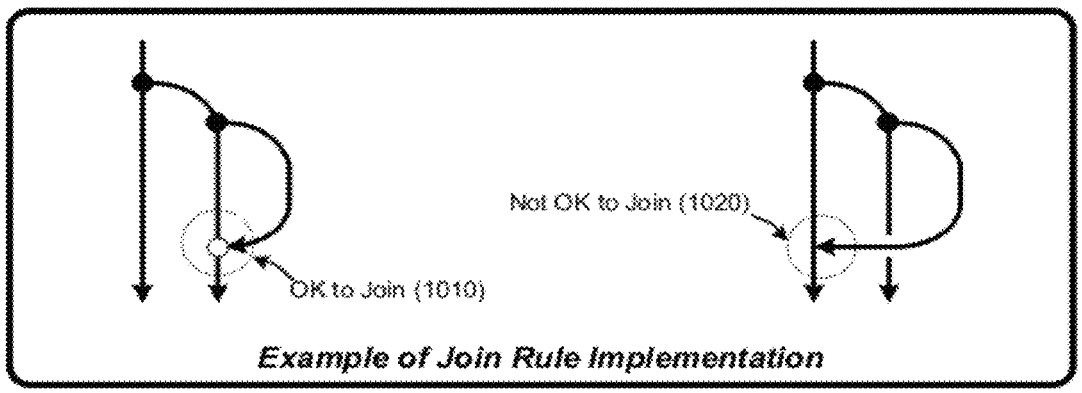
FIG. 10 provides an illustration of a join rule implementation, as described herein.

When synchronizing, the Eventually Consistent Sharing Model ensures that clients and servers maintain the proper revision diagrams result. In particular, the proper result is maintained by causing each client and server to follow a "join rule" which states that joiners must be downstream from the fork that forked the joinee. FIG. 10 provides a simple example of when this rule satisfied and it is OK to join (1010), and when this rule is not satisfied and it is therefore not OK to join (1020).

Referring back to FIG. 9, to ensure this condition, the Eventually Consistent Sharing Model assigns "round numbers" to servers and clients based on local transitions, and uses "round maps" to determine eligibility (by determining which forks are in the visible history, based on which round the server or client is currently in). Note that round maps can be considered a form of vector clocks. These round numbers (i.e., "Rnd 0" up to "Rnd 4" for the clients and servers in this example) are illustrated in FIG. 9 along the central revision for each client and server. As illustrated, all clients and servers start with round 0, except the main revision (which in this example is on server $S_2$) that starts (and forever remains) in round 1. After each fork by any particular client or server, the round number of that client or server is incremented. Therefore, since any particular client or server performs forks at different times, there is no requirement for any particular server or client to be in the same round at the same actual clock time.

In view of the preceding examples, formal definitions of the ideas outlined above are provided in the following paragraphs. These formal definitions begin by introducing some notation to prepare for operational rules that are presented in below in Table 7 and Table 8.

First, a system configuration $\mathcal{C}$ is defined to be a partial function from identifiers (representing servers or clients) to a server or client state, respectively. For a client identifier c, a client state $\mathcal{C}$ (c) is a tuple (r, e, $\sigma$) consisting of a round number r, an expression e, and the revision $\sigma$. For a server identifier s, the server state $\mathcal{C}$ (s) is a tuple (r, R, $\sigma$) consisting of a round number r, a round map R and a revision state $\sigma$.

The revision state $\sigma$ represents the state of the current replica for a particular client or server. Note that a more detailed description of the implementation of $\sigma$ is provided below in Section 2.3.4, where it is presented along with a discussion of cloud types and definitions of "fork-join automata" that allow the Eventually Consistent Sharing Model to operate with abstract or virtual representations of revision diagrams. In general, it should be understood that a is in some set $\Sigma$, supports all the local data operations, has an initial state $\sigma_0$, and supports fork and join functions fork: $\Sigma \rightarrow \Sigma \times \Sigma$ and join: $\Sigma \times \Sigma \rightarrow \Sigma$, respectively. Moreover, it is assumed that fork($\sigma_0$)=($\sigma_0$, $\sigma_0$). In other words, forking from the initial state yields that same initial state.

The round numbers r are used to track which clients (and servers) can synchronize with particular servers at any particular point in time. After each fork, the round number of a client or server is incremented. The round map R on a server s is a total function that maps each identifier i of a client or server to a round number R(i) that is the number of the last round whose fork is in the visible history of s. The initial round map $R_0$ maps all clients and servers to "round 0" (since round 0 is always forked from the initial state of the main revision, it is retroactively in the visible history). The rules are set up to enforce that a client c (or server s) with round number r can only communicate with a server where R(c)=r.

Table 7 presents transition rules of the form $\mathcal{C} \Rightarrow \mathcal{C}'$ where cloud state $\mathcal{C}$ updates to $\mathcal{C}'$. The pattern match notation $\mathcal{C}$ ($a_1 \mapsto b_1, \ldots, a_n \mapsto b_n$) is used to match on a partial function $\mathcal{C}$ satisfying $\mathcal{C}$ ($a_i$)=$b_i$, $\forall i.\ 1 \leq i \leq n$. The expression $\mathcal{C}$ [$a \mapsto b$] is used to denote a partial function that is equivalent to $\mathcal{C}$ except that $\mathcal{C}$ (a)=b.

For any cloud state there are potentially many valid transitions that capture the inherent concurrency and nondeterminism of cloud execution. For example, clients can be spawned and terminated at any time using the rules [Spawn] and [Term] illustrated in Table 7, and clients can arbitrarily interleave local evaluation.

The rules [Yield-Nop], [Yield-Push] and [Yield-Pull] describe how clients synchronize with servers. Note that the [Yield-Nop] states that a yield instruction can be ignored, allowing disconnected clients to continue executing. The rule [Yield-Push] sends a revision to an eligible server, while the rule [Yield-Pull] receives a revision from an eligible server. In both cases, the round number of the client is incremented and the round map of the server is updated. The new states of the client and server are determined by forking/joining revisions appropriately, as illustrated by FIG. 9.

TABLE 7

Cloud Evaluation Rules for Clients.

Eval $\dfrac{e; \sigma \to e'; \sigma'}{\mathcal{C}(c \mapsto (r, e, \sigma)) \Rightarrow \mathcal{C}[c \mapsto (r, e', \sigma')]}$ Spawn $\dfrac{c \neq \text{dom}(\mathcal{C}) \quad \text{fork}(\sigma_0) = (\sigma, \sigma')}{\mathcal{C} \Rightarrow \mathcal{C}[c \mapsto (0, e, \sigma')]}$ Yield-Push $\dfrac{R(c) = r \quad R' = R[c \mapsto r+1] \quad \text{fork}(\sigma_c) = (\sigma'_c, \sigma''_c) \quad \text{join}(\sigma_s, \sigma'_c) = \sigma'_s}{\mathcal{C}(s \mapsto (r_s, R, \sigma_s), c \mapsto (r, \varepsilon[[\text{yeild}]], \sigma_c)) \Rightarrow \mathcal{C}[s \mapsto (r_s, R', \sigma'_s), c \mapsto (r+1, \varepsilon[[(\ )]], \sigma''_c)]}$ Yield-Pull $\dfrac{R(c) = r \quad R' = R[c \mapsto r+1] \quad \text{fork}(\sigma_s) = (\sigma'_s, \sigma''_s) \quad \text{join}(\sigma''_s, \sigma_c) = \sigma'_c}{\mathcal{C}(s \mapsto (r_s, R, \sigma_s), c \mapsto (r, \varepsilon[[\text{yeild}]], \sigma_c)) \Rightarrow \mathcal{C}[s \mapsto (r_s, R', \sigma'_s), c \mapsto (r+1, \varepsilon[[(\ )]], \sigma'_c)]}$ Yield-Nop $\dfrac{}{\mathcal{C}(c \mapsto (r, \varepsilon[[\text{yield}]], \sigma_c)) \Rightarrow \mathcal{C}[c \mapsto (r, \varepsilon[[(\ )]], \sigma)]}$ Term $\dfrac{R(c) = r \quad \text{join}(\sigma_s, \sigma_c) = \sigma'_s}{\mathcal{C}(s \mapsto (r_s, R, \sigma_s), c \mapsto (r, \varepsilon[[\text{yeild}]], \sigma_c)) \Rightarrow \mathcal{C}[s \mapsto (r_s, R', \sigma'_s), c \mapsto \bot]}$ Table 8, below, shows the rules for server synchronization. The rules [Create] and [Retire] simply create and retire servers on demand, thereby enabling a wide variety of flexible server pool scenarios where servers can enter or leave the pool as needed. The [Sync] rule is the synchronization rule for servers and is similar to a simplified (more synchronous) version of [Yield]. The premise ensures that the round number matches, the round number is incremented, and the state is first joined and then forked again. What is different is that the round maps of both servers are also joined using $R = \max(R_s, R_t)$ (taking the pointwise max of the vector clocks).

TABLE 8

Cloud Evaluation Rules for Servers.

Create $\dfrac{s \neq \text{dom}(\mathcal{C})}{\mathcal{C} \Rightarrow \mathcal{C}[s \mapsto (0, R_0, \sigma_0)]}$ TABLE 8-continued Cloud Evaluation Rules for Servers.

Sync-Push $\dfrac{R_s(t) = r_t \quad R'_s = \max(R_s, R_t) \quad R''_s = R'_s[t \mapsto r_t + 1] \quad \text{fork}(\sigma_t) = (\sigma'_t, \sigma''_t) \quad \text{join}(\sigma_s, \sigma'_t) = \sigma'_s}{\mathcal{C}(s \mapsto (r_s, R_s, \sigma_s), t \mapsto (r_t, R_t, \sigma_t)) \Rightarrow \mathcal{C}[s \mapsto (r_s, R''_s, \sigma'_s), t \mapsto (r_t + 1, R_t, \sigma''_c)]}$ Sync-Pull $\dfrac{R_s(t) = r_t \quad R'_t = \max(R_s, R_t) \quad R'_s = R_s[t \mapsto r_t + 1] \quad \text{fork}(\sigma_s) = (\sigma'_s, \sigma''_s) \quad \text{join}(\sigma''_s, \sigma_t) = \sigma'_t}{\mathcal{C}(s \mapsto (r_s, R_s, \sigma_s), t \mapsto (r_t, R_t, \sigma_t)) \Rightarrow \mathcal{C}[s \mapsto (r_s, R'_s, \sigma'_s), t \mapsto (r_t + 1, R'_t, \sigma'_t)]}$ Retire $\dfrac{R_s(t) = r_t \quad R'_s = \max(R_s, R_t) \quad \text{join}(\sigma_s, \sigma_c) = \sigma'_s}{\mathcal{C}(s \mapsto (r_s, R_s, \sigma_s), t \mapsto (r_t, R_t, \sigma_t)) \Rightarrow \mathcal{C}[s \mapsto (r_s, R'_s, \sigma'_s), t \mapsto \bot]}$ 2.3.3.1 Flush:

To describe the flush operation, an initial main server $s_{main}$, is specified or otherwise distinguished. The flush operation ensures that all updates of a client are joined in the main server $s_{main}$, and that client sees all state changes in the main server that were applied before the client state was joined.

To track which client updates have been seen by the main server, an extra round number $c^{flush}$ is added in the round map. As illustrated below in Table 9, the main server can always execute the rule [Commit] to set the $C^{flush}$ entries to the corresponding round numbers of the clients that have synchronized with the main server. Further, using the [Sync-Push] and [Sync-Pull] rules illustrated in Table 8, any servers that synchronize with the main server will propagate these $c^{flush}$, entries automatically.

TABLE 9

Semantics of the Flush Operation.

Flush-Push $\dfrac{R_c = r \quad R' = R[c \mapsto r+1] \quad \text{join}(\sigma_s, \sigma_c) = \sigma'_s}{\mathcal{C}(s \mapsto (r_s, R, \sigma_s), c \mapsto (r, \varepsilon[[\text{flush}]], \sigma_c)) \Rightarrow \mathcal{C}[s \mapsto (r_s, R'_s, \sigma'_s), c \mapsto (r+1, \varepsilon[[\text{block}]], \sigma_c)]}$ Flush-Pull $\dfrac{R(c^{flush}) = r \quad \text{fork}(\sigma_s) = (\sigma'_s, \sigma'_c)}{\mathcal{C}(s \mapsto (r_s, R, \sigma_s), c \mapsto (r, \varepsilon[[\text{block}]], \sigma_c)) \Rightarrow \mathcal{C}[s \mapsto (r_s, R, \sigma'_s), c \mapsto (r, \varepsilon[[(\ )]], \sigma'_c)]}$ Commit $\dfrac{R' = R[\forall c. c^{flush} \mapsto R(c))}{\mathcal{C}(s_{main} \mapsto (0, R, \sigma)) \Rightarrow \mathcal{C}[s_{main} \mapsto (0, R', \sigma)]}$ The rule [Flush-Push] is applied whenever the client does a flush operation. The rule is similar to [Yield-Push] but blocks the client. In addition, only the state of the client is joined with the server state, but the client state itself does not fork a new revision. The round map of the server s is updated though with the new round number $c \mapsto r+1$. This allows the servers to execute [Sync] until the state changes are propagated all the way up to the $s_{main}$ server. At that point, the main server can make a [Commit] transition, making $c^{flush} \mapsto r+1$. After again doing more [Sync] transitions, the new $c^{flush}$ entry makes it back to the original server. At this point, [Flush-Pull] can apply where the server state is forked now into a new server state $\sigma'_s$ and client state $\sigma'_c$, and where the client is unblocked again.

2.3.3.2 Message Protocols and Server State:

For purposes of explanation, the rules presented above are still somewhat more abstract than needed for an actual implementation. In practice, all communication is asynchronous (based on message delivery) and considered to be unreliable (i.e., typical lossy network communications). Thus, various tested embodiments of the Eventually Consistent Sharing Model operate to break synchronous transition rules (like Yield-Push, Yield-Pull, Sync, Flush-Pull, and Flush-Push) into message protocols, use state machines that are locally persisted, and retransmit messages if they are lost.

In general, the protocol can be considered "stateless" on the server. More specifically, this is "almost" true since the replica state on the server is indeed unaware of the client, but there is still the round map R that may contain information about the client. Still, actual implementations of the Eventually Consistent Sharing Model can be adapted to deal with cases where the client goes silent (i.e., unexpectedly drops offline or otherwise disconnects). In particular, if a client goes silent, the statelessness capabilities of the Eventually Consistent Sharing Model ensure that the server can purge all states related to that client, after some period, as soon as all round maps of all servers see the same round of that client. Advantageously, if the client reconnects later, it simply starts with a fresh client id and round number without losing any changes it performed while offline.

Another advantage of the Eventually Consistent Sharing Model concerns the size of messages. Sending the full replica state in messages is often impractical, depending upon the size of the replica and the available bandwidth. Therefore, in various embodiments, the Eventually Consistent Sharing Model enables compression by sending diffs of the state rather than the entire state. This compression again introduces some server state for each client; but again, this server state is not important and can be thrown away if a client goes silent. Then, the next time the client connects, the full replica state will be transmitted the first time.

2.3.4 Cloud Types:

Note that the aforementioned co-pending U.S. patent application uses the term "isolation types" to refer to the same general concept as the term "cloud types" as discussed in this document, except that the cloud types described herein are used in the context of cloud-based applications. In other words, these cloud types are adapted by the Eventually Consistent Sharing Model for use in various cloud computing environments as discussed herein. The following paragraphs describe the cloud type implementations of the Eventually Consistent Sharing Model in more detail. To this end, the concept of a "fork-join automaton" is defined. In general, fork-join automata are defined below as concrete implementations of cloud types, consisting of implementations for the abstract update and query operations, and concrete implementations of fork and join.

Definition 15: Similar to "Definition 2" which describes a "query-update automaton" (QUA), a "fork-join automaton" is a tuple (Q, U, $\Sigma$, $\sigma_0$, f, j) where:

1. Q is an abstract set of query operations;
2. U is an abstract set of update operations;
3. $\Sigma$ is a set of states;
4. $\sigma_0 \in \Sigma$ is the initial state;
5. Queries and updates have an interpretation as functions, specifically:
   a. Each query operation $q \in Q$ defines a function $q^\#$: $\Sigma \rightarrow \text{Val}$, and
   b. Each update operation $u \in U$ defines a function $u^\#$: $\Sigma \rightarrow \Sigma$;
6. f:$\Sigma \rightarrow \Sigma \times \Sigma$ is a function for splitting the current state on a fork; and
7. j:$\Sigma \times \Sigma \rightarrow \Sigma$ is a function for merging states on a join.

Note also that "fork-join automaton" are introduced above in Section 2.2.7 and initially referred to as FJ-QUA's (i.e., fork-join query update automaton). The fork-join automata enabled by the Eventually Consistent Sharing Model satisfy a correctness condition. In particular, fork-join automata correctly track and apply updates when revisions are forked and joined (as discussed above in Section 2.3.1.3). This correctness condition is discussed only informally here, since its definition depends on the definition of revision diagrams provided in the aforementioned co-pending US patent application.

In the following paragraphs, an exemplary fork-join automaton is defined for the entire cloud state (i.e., for all cloud data declared by the user). First, a fork-join automaton is defined for the primitive cloud types CInt and CString. Then, an example of how to define the cloud types for entities and arrays is provided. Finally, an example showing how to implement the cloud type CSet as "syntactic sugar" is provided.

2.3.4.1 A Fork-Join Automaton for CInt:

For cloud integers, the Eventually Consistent Sharing Model supports operations "get" and "set" to read and write the current value, as well as "add", as illustrated in Table 10, below. Three values are stored in the state, including:

1. A boolean indicating whether the current revision performed any set operations;
2. A base value; and
3. An offset.

On fork, the boolean is reset, the base value is set to the current value, and the offset is set to zero. Add operations change only the offset, while set operations set the boolean to true, set the base value, and reset the offset. On join, the value of the joined revision is assumed (if it performed a set) or add its offset (otherwise). This produces the desired semantics (see Section 2.3.1.3 for examples).

TABLE 10

Fork-Join Automaton for CInt.

$Q^{CInt}$: {get}
$U^{CInt}$: {set(n)|n $\in$ int} $\cup$ {add(n)|n $\in$ int}
$\Sigma^{CInt}$: bool $\times$ int $\times$ int
$\sigma_0^{CInt}$: (false, 0, 0)
add(n)$^\#$(r, b, d) = (r, b, d + n)
set(n)$^\#$(r, b, d) = (true, n, 0)
get$^\#$(r, b, d) = b + d
$f^{CInt}$ (r, b, d) = (r, b, d), (false, b + d, 0)

$$j^{CInt}(r_1, b_1, d_1)(r_2, b_2, d_2) = \begin{cases} (\text{true}, b_2, d_2) & \text{if } r_2 = \text{true} \\ (r_1, b_1, d_1 + d_2) & \text{otherwise} \end{cases}$$

2.3.4.2 A Fork-Join Automaton for CStrinq:

For cloud strings, the Eventually Consistent Sharing Model supports operations "get" and "set" to read and write the current value, and a conditional operation "setifEmpty" as illustrated in Table 11. In the state, the Eventually Consistent Sharing Model records the current value and whether it has not been written (i.e., "⊥"), has been written (i.e., "wr"), or has been conditionally written (i.e., "cond"). Note that a conditional write succeeds only if the current value is empty, and that this test is repeated on merge.

TABLE 11

Fork-join Automaton for CString.

$Q^{CString}$: {get}
$U^{CString}$: {set(s)|s ∈ string} ∪ {setIfEmpty(s)|s ∈ string\{" "}}
$\Sigma^{CString}$: {⊥, wr, cond(string)} × string
$\sigma_0^{CString}$: (⊥, " ")
$set(s)^{\#}(r, t) = (wr, s)$ $$setIfEmpty(s)^{\#}(r, t) = \begin{cases} (wr, s) & \text{if } r = wr \wedge t = "" \\ (cond(s), s) & \text{if } r = \bot \wedge t = "" \\ (cond(s), t) & \text{if } r = \bot \wedge t \neq "" \\ (r, t) & \text{otherwise} \end{cases}$$

$get^{\#}(r, s) = s$
$f^{CString}(r, s) = (r, s), (\bot, s)$ $$j^{CString}(r_1, s_1)(r_2, s_2) = \begin{cases} (wr, s_2) & \text{if } r_2 = wr \\ (wr, s) & \text{if } r_1 = wr \wedge s_1 = "" \wedge r_2 = cond(s) \\ (cond(s), s) & \text{if } r_1 = \bot \wedge s_1 = "" \wedge r_2 = cond(s) \\ (cond(s), s_1) & \text{if } r_1 = \bot \wedge s_1 \neq "" \wedge r_2 = cond(s) \\ (r_1, s_1) & \text{otherwise} \end{cases}$$

2.3.4.3 A Fork-Join Automaton for the Complete State:

In view of the proceeding discussion, for a fixed schema S, the entire state can now be defined as a fork-join automaton. First, the query operations $Q^S$ and the update operations $U^S$ are defined as illustrated in Table 12, below.

TABLE 12

Definition of Query and Update Operations.

| Operation | Argument Tyes | Return Type | Entity/ Property Definition |
|---|---|---|---|
| $all_E$ | | set( E) | entity $E(k_1:\iota_1,...,k_n:\iota_n)$ |
| $create_E(e)$ | E | | entity $E(k_1:\iota_1,...,k_n:\iota_n)$ |
| $delete_E(e)$ | E | | entity $E(k_1:\iota_1,...,k_n:\iota_n)$ |
| $entries_p$ | | set(ι) | property p : ι → ω |
| $query_p(i,q)$ | ι,$Q^\omega$ | val | property p : ι → ω |
| $update_p(i,u)$ | ι,$U^\omega$ | | property p : ι → ω |

Next, the state space is defined to consist of separate components for each entity type and each property, as illustrated by Equation (11):

$$\Sigma^S = \prod_{p \in S} \Sigma_p \times \prod_{E \in S} \Sigma_E \quad \text{Equation (11)}$$

For each declaration, property p:ι→ω, a total function from keys to values is stored, where keys are of the corresponding index type, and values belong to the state space of the corresponding fork-join automaton, as illustrated by Equation (12):

$$\Sigma_p \rightarrow \iota \rightarrow \Sigma^\omega \quad \text{Equation (12)}$$

For each declaration, $E(k_1:\iota_1, \ldots, k_n:\iota_n)$, the Eventually Consistent Sharing Model stores the total function from entities to a state that indicates whether this entity is not yet created (i.e., "⊥"), exists as a normal entity (i.e., "ok"), or has been deleted (i.e., "T"), as illustrated by Equation (13):

$$\Sigma_E = E \rightarrow \{\bot, ok, T\} \quad \text{Equation (13)}$$

For a state $\sigma \in \Sigma^S$, $\sigma_p$, and $\sigma_E$, are the projection on the respective components.

Naturally, in the initial state $\sigma_0^S$, all property indexes are mapped to $\Sigma_0^\omega$ (i.e., the initial state of the corresponding fork-join automaton) and all entities are mapped to ⊥. The implementation of queries, updates, fork, and join are illustrated below in Table 13 using pseudo-code, followed by an explanation of each of these elements.

TABLE 13

Complete Fork-Join Automaton

```
// Operations on Entities
create_E(e){
    σ_E(e) := σ_E(e)[e ↦ ok];
}
delete_E(e){
    σ_E(e) := σ_E(e)[e ↦ T];
}
all_E{
    return {e ∈ E}σ_E(e) = ok;
}
// Auxiliary Functions
propogate ( ){
    while exists E,e such that
        σ_E(e) ≠ T and deleted(e)
    do
        σ_E(e) := σ_E(e)[e ↦ T]
}
deleted(e){
    match i with
        A[i_1,...,i_n]:
            return (exists j such that deleted(i_j));
        E[uid,i_1,...,i_n]:
            return σ_E(i) = T
                or (exists j such that deleted(i_j));
        else // string or integer
            return false;
}
isdefault(σ){
    if σ ∈ Σ^{CInt}
        return get^# σ = 0;
    else if σ ∈ Σ^{CString}
        return get^# σ " ";
    else if σ ∈ Σ^{CSet}
        return elems^# σ = ∅;
}
// Operations on Properties
query_p(i,q){
    if (deleted (i))
        return ⊥;
    else
        return σ_p(i).q;
}
update_p(i,u){
    if (not deleted (i))
        σ_p(i).u;
}
entries_p {
    return all i ∈ ι
        where (not isdefault (σ_p(i)))
        and (not deleted (i))
}
// Fork and Join Functions
fork( ){
    var σ' = σ; // copy the state
    foreach property p : ι → ω
        foreach i ∈ ι
            (σ_p(i), σ_p'(i)) := f^ω(σ_p(i));
    return σ';
}
join(σ') {
    foreach property p : ι → ω
        foreach i ∈ ι
            σ_p(i) := j^ω(σ_p(i), σ_p'(i));
```

TABLE 13-continued

Complete Fork-Join Automaton

```
foreach entity E(k₁ : ι₁,...,kₙ : ιₙ)
    foreach σ ∈ E
        σ_E(e) := max(σ_E(e), σ_E'(e))
    propagate( );
}
max(s₁,s₂) uses the order ⊥ < ok < T
```

The elements illustrated above in Table 13 are explained as follows:

Create adds a fresh element to an entity by mapping it to ok. It is assumed that each client can create fresh elements (based on a local id and counter). However, in the case that a client is not capable of this operation for any reason, the Eventually Consistent Sharing Model can instruct the server (or server pool) to add fresh elements;

Delete maps the deleted element to T to mark it as deleted. Note that this element cannot be simply removed, because at joins, it would be impossible to determine if one side is fresh, or the other deleted. Therefore, extra book-keeping can be used to eventually collect these tombstones;

Deletion also causes any dependent entities to be deleted. This is achieved by Propagate. Note that entity dependencies cannot be cyclic, since an entity can only be used in the creation of another when it is already defined;

all_E returns all non-deleted values of a given entity;

A query q on an entry i of property p is answered by delegating it to the QUA of p at i, provided that i is not deleted;

Similarly, an update u on an entry i of property p is delegated to the QUA of p at i, provided i is not deleted.

entries_p returns all the entries of a property p that map to non-default QUAs and are not deleted.

Forking the overall QUA turns into a point-wise forking of all the QUA's of each property. The entity maps are unaffected by forking.

Joining is similarly performed point-wise on all properties. For entities, joining is achieved by computing the maximum in the order ⊥<ok<T. This achieves deleting the entry, provided any one side has it deleted, or keeping it allocated, if any one side has it allocated. At joins, the Eventually Consistent Sharing Model also re-propagates deletions to all dependent elements, as new deletions can be merged into the revision.

Advantageously, the complete state QUA operations are commutative by themselves. The only non-commutative operations are in the QUAs implementing cloud types. This property makes using arrays and entities very natural and does not introduce unexpected conflict resolutions. Furthermore, the design of the Eventually Consistent Sharing Model enables a modular implementation of the complete state QUA with respect to cloud type implementations. In part, this structure makes a single parameterized, reusable implementation of cloud storage and synchronization possible. Consequently, any schema and any extensions of cloud types can be supported without further changes.

2.3.4.4 Implementation of CSet:

Rather than defining sets directly, the Eventually Consistent Sharing Model encodes them relationally, building on the abstraction mechanism provided by entities. Given a schema definition for a property of type CSet⟨ι⟩, it is rewritten to an entity definition whose entities represent "instances" of additions of elements, as illustrated by Equation (14):

$$\text{property } p:\iota' \to CSet\langle \iota \rangle \equiv \text{entity } E_p[\text{index}:\iota', \text{element}:\iota] \quad \text{Equation (14)}$$

Given this definition, operations are indirectly encoded as follows:

x.add(i)≡{new E_p(x, i);}
x.contains(i)≡{return(all E_p, where index==x and element==i).isNotEmpty( );}
x.remove(i)≡{foreach (e in all E_p, where index==x and element==i)e.delete( );}

Figure 11:
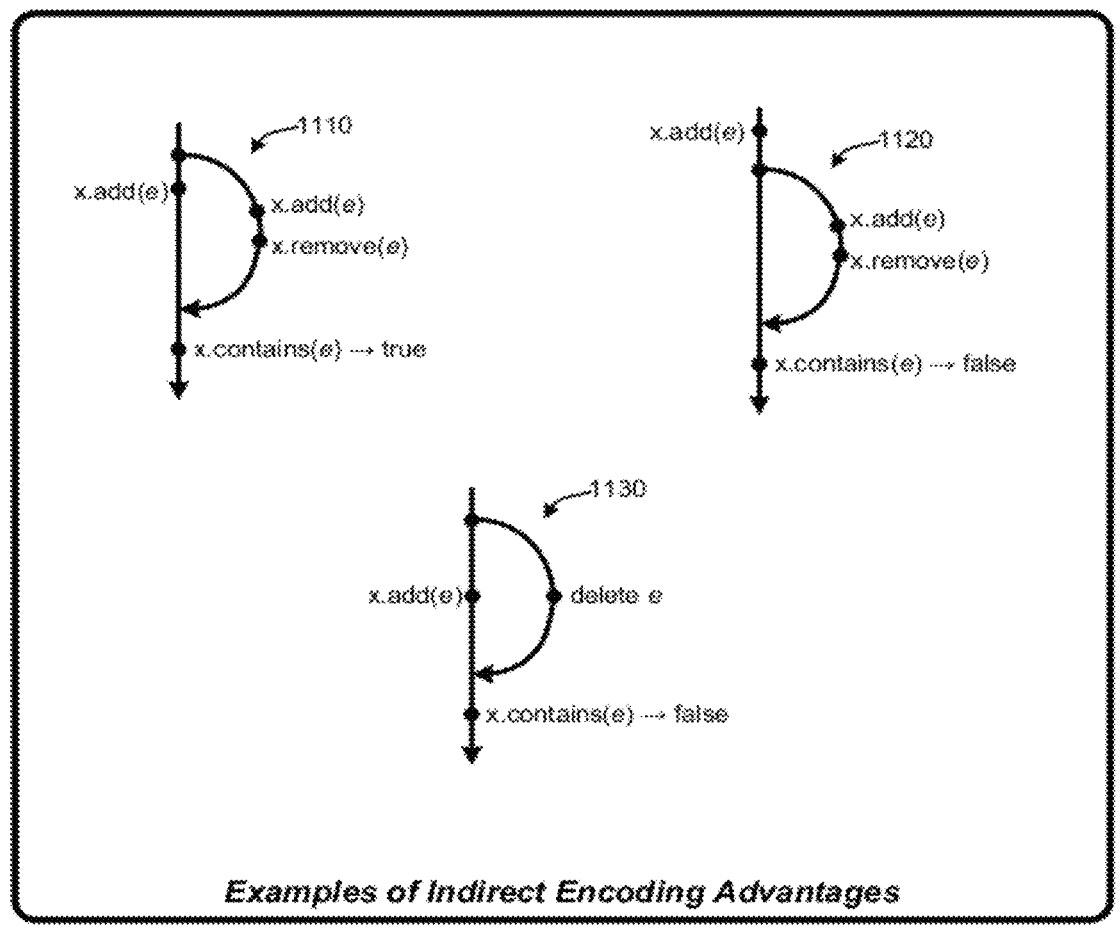
FIG. 11 provides various examples of indirect encoding advantages, as described herein.

This indirect encoding has various advantages, including those illustrated by FIG. 11, and as described below:

Removing an element from a set (1110 and 1120) only removes instances that were visibly added before the remove. Thus, as illustrated by revision diagram 1110, since the x.remove(e) occurred on a revision forked prior to the x.add(e) on the main revision, then x.contains(e) is still true after the forked revision joins the main revision. In contrast, as illustrated by revision diagram 1120, since the x.remove(e) occurred on a revision forked after the the x.add(e) on the main revision, then x.contains(e) is false after the forked revision joins the main revision. This is referred to as observed-remove behavior for eventually consistent sets; and If the user deletes an entity, that entity disappears automatically from all sets that contain it. This concept is illustrated by revision diagram 1130, where it can be seen that even though the "delete e" occurred on a revision forked prior to the x.add(e) on the main revision, x.contains(e) is false since the "delete e" acts on all sets, as noted above.

Figure 12:
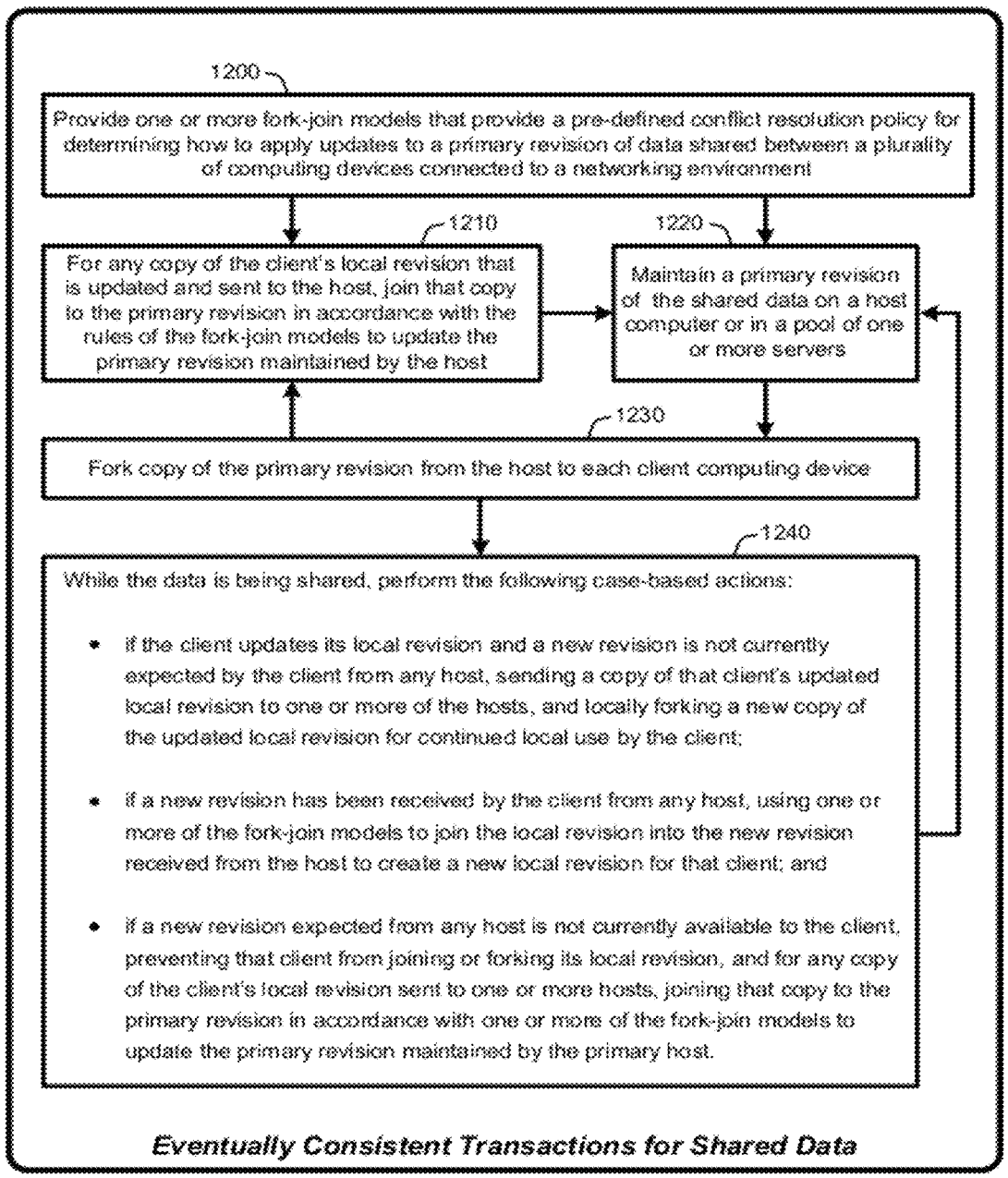
FIG. 12 illustrates a general system flow diagram that illustrates exemplary methods for implementing eventually consistent transactions for shared data, as described herein.
Figure 13:
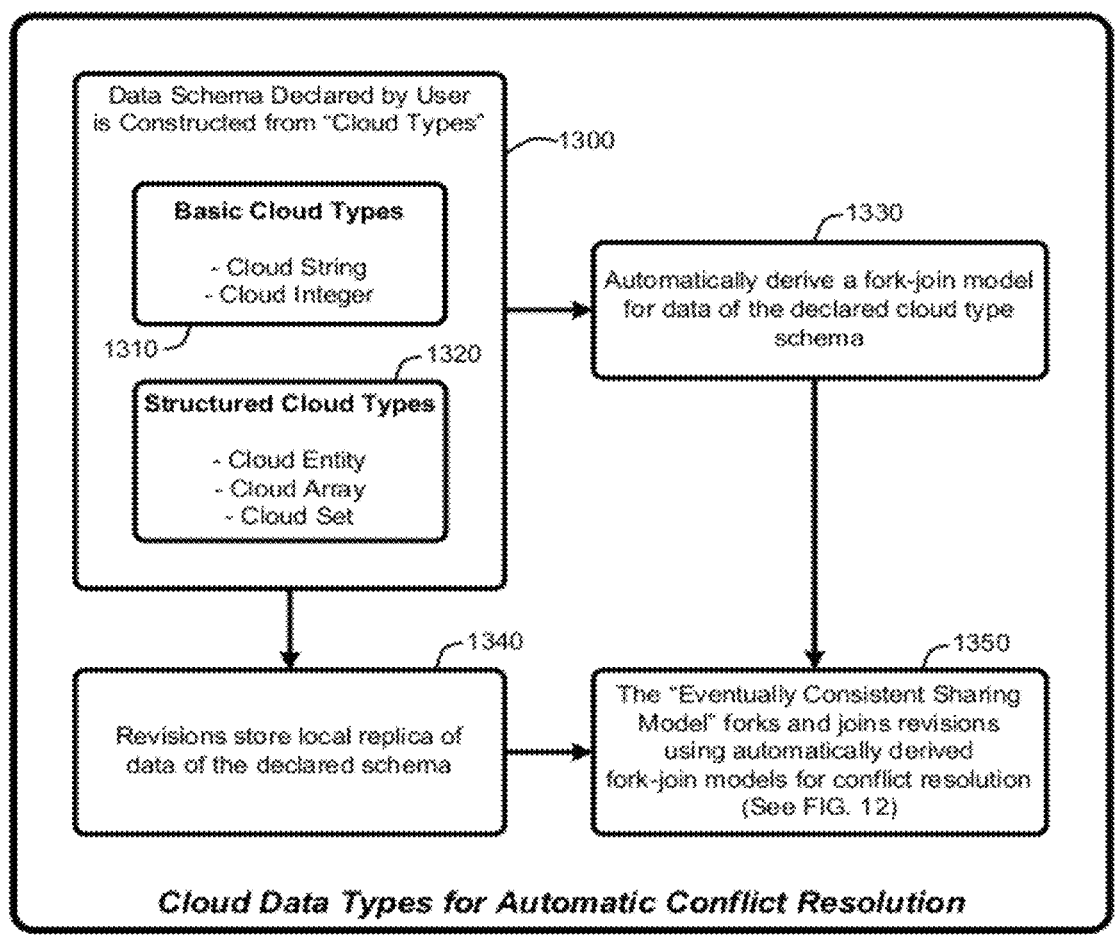
FIG. 13 illustrates a general system flow diagram that illustrates exemplary methods for implementing "cloud data types" for automatic conflict resolution, as described herein.
Figure 14:
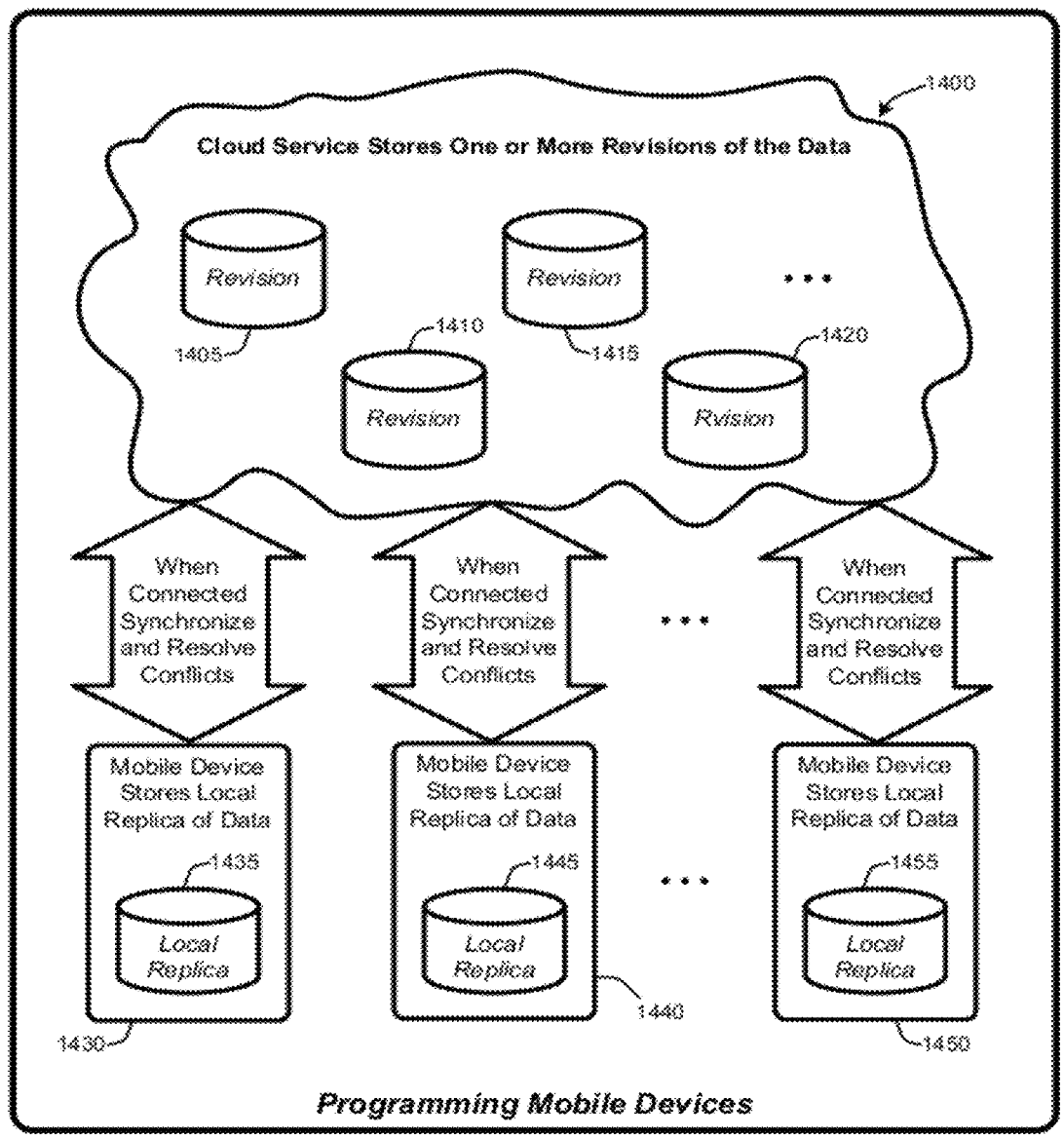
FIG. 14 illustrates a general system flow diagram that illustrates exemplary methods for programming mobile devices to enable eventually consistent transactions for shared data, as described herein.

3.0 Operational Summary:

The processes described above with respect to FIG. 1 through FIG. 10 and in further view of the detailed description provided above in Sections 1 and 2are illustrated by the general operational flow diagrams of FIG. 12 through FIG. 14. In particular, FIG. 12 through FIG. 14 provide exemplary operational flow diagrams that summarize the operation of some of the various embodiments of the Eventually Consistent Sharing Model. Note that FIG. 12 through FIG. 14 are not intended to provide exhaustive representations of all of the various embodiments of the Eventually Consistent Sharing Model described herein, and that the embodiments represented in FIG. 12 through FIG. 14 are provided only for purposes of explanation.

Further, it should be noted that any boxes and interconnections between boxes that are represented by broken or dashed lines in FIG. 12 through FIG. 14 represent optional or alternate embodiments of the Eventually Consistent Sharing Model described herein, and that any or all of these optional or alternate embodiments, as described below, may be used in combination with other alternate embodiments that are described throughout this document.

In general, as illustrated by FIG. 12, the Eventually Consistent Sharing Model achieves eventually consistent transactions for shared data by first providing 1200 one or more fork-join models that provide a pre-defined conflict resolution policy for determining how to apply updates to a primary revision of data shared between a plurality of computing devices connected to a networking environment.

A primary revision of the shared data is then maintained 1220 on a host computer or in a pool of one or more servers. Shared copies of this primary revision are then forked 1230, either on client demand or pushed by the server or host, to individual client computing devices.

In general, revision updates performed by any client (or secondary host) are propagated through to the primary revision. In particular, for any copy of the client's local revision that is updated and sent to the host, that copied is joined 1210 to the primary revision in accordance with the rules of the fork-join models to update the primary revision maintained by the host.

Further, in a more detailed sense, while the data is being shared, the following case-based actions 1240 are performed:

- if the client updates its local revision and a new revision is not currently expected by the client from any host, sending a copy of that client's updated local revision to one or more of the hosts, and locally forking a new copy of the updated local revision for continued local use by the client;
- if a new revision has been received by the client from any host, using one or more of the fork-join models to join the local revision into the new revision received from the host to create a new local revision for that client; and
- if a new revision expected from any host is not currently available to the client, preventing that client from joining or forking its local revision, and for any copy of the client's local revision sent to one or more hosts, joining that copy to the primary revision in accordance with one or more of the fork-join models to update the primary revision maintained by the primary host.

In general, as discussed in detail throughout Section 2.3.4, and as illustrated by FIG. 13, the Eventually Consistent Sharing Model uses the concept of "cloud types" to achieve eventually consistent transactions for shared data.

In particular, as illustrated by FIG. 13, a data schema 1300 declared by the user for enabling operation of the Eventually Consistent Sharing Model is constructed from "cloud types." In general, cloud types include, but are not limited to, basic cloud types 1310 and structured cloud types 1320. The basic cloud types 1310 include, but are not limited to, "cloud strings" and "cloud integers". The structured cloud types 1320 include, but are not limited to, "cloud entities," "cloud arrays," and "cloud sets." Again, these cloud types are intended to be understood in view of the description provided in Section 2.3.4.

Once the data schema 1300 has been constructed from the cloud types (1310 and/or 1320), automatic conflict resolution is enabled by automatically deriving 1330 a fork-join model for shared data of the declared cloud type schema 1300. Further, revisions of the shared data held by clients (and potentially hosts) store 1340 local replicas of data of the declared schema 1300.

Finally, as illustrated by element 1350 of FIG. 13, given the above-described information, the Eventually Consistent Sharing Model forks and joins revisions using the automatically derived fork-join models for conflict resolution in order to manage and join updates to any revision by any client or host at any time. See FIG. 12 for additional discussion regarding joining of updates to provide eventually consistent transactions.

Finally, as illustrated by FIG. 14, the aforementioned techniques are advantageously used to enable programming that provides data sharing for mobile devices variously (and possibly intermittently) connected via a networking environment including, but not limited to, cloud services or cloud-based computing environments. Note also that any one or more of these "mobile devices" may be desktop or other computer types or devices that are connected to the cloud service or cloud-based computing device.

More specifically, FIG. 14 provides an architectural diagram that illustrates communications between a plurality of mobile devices (1430, 1440, and 1450) in communication with a cloud service (1400) for enabling eventually consistent transactions relative to one or more revisions (1405, 1410, 1415, 1420) data shared between those mobile devices, and held by each device as a local replica (1435, 1445, and 1455) of that shared data. In general, as illustrated by FIG. 14, the techniques described throughout this document enable eventually consistent transactions by synchronizing and resolving conflicts between the local replicas (1435, 1445, and 1455) held by each client or mobile device (1430, 1440, and 1450) whenever the mobile device is connected to the cloud service 1400.

Figure 15:
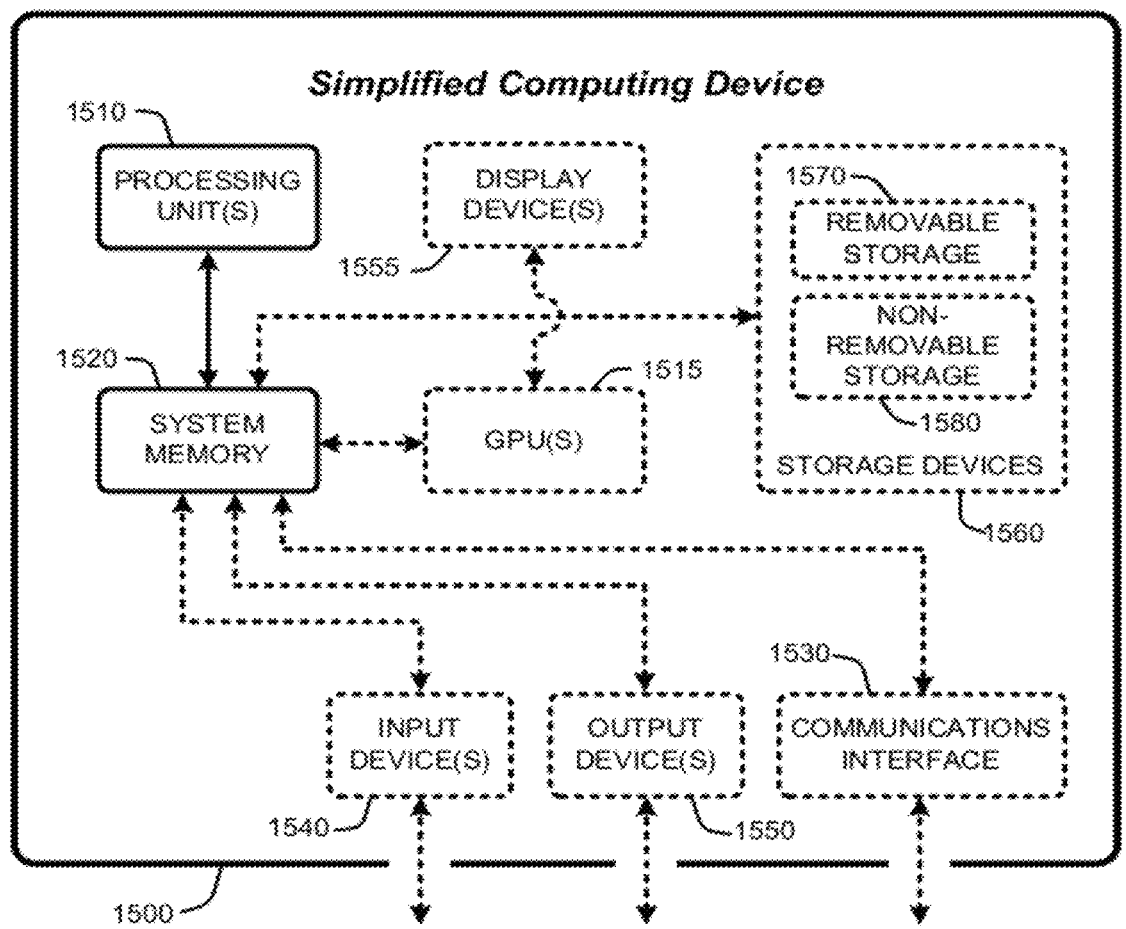
FIG. 15 is a general system diagram depicting a simplified general-purpose computing device having simplified computing and I/O capabilities for use in implementing various embodiments of the Eventually Consistent Sharing Model, as described herein.

4.0 Exemplary Operating Environments:

The Eventually Consistent Sharing Model described herein is operational within numerous types of general purpose or special purpose computing system environments or configurations. FIG. 15 illustrates a simplified example of a general-purpose computer system on which various embodiments and elements of the Eventually Consistent Sharing Model, as described herein, may be implemented. It should be noted that any boxes that are represented by broken or dashed lines in FIG. 15 represent alternate embodiments of the simplified computing device, and that any or all of these alternate embodiments, as described below, may be used in combination with other alternate embodiments that are described throughout this document.

For example, FIG. 15 shows a general system diagram showing a simplified computing device such as computer 1500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Eventually Consistent Sharing Model, the device should have a sufficient computational capability and system memory to enable basic computational operations. In particular, as illustrated by FIG. 15, the computational capability is generally illustrated by one or more processing unit(s) 1510, and may also include one or more GPUs 1515, either or both in communication with system memory 1520. Note that that the processing unit(s) 1510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 15 may also include other components, such as, for example, a communications interface 1530. The simplified computing device of FIG. 15 may also include one or more conventional computer input devices 1540 (e.g., pointing devices, keyboards, audio input devices, video input devices, haptic input devices, devices for receiving wired or wireless data transmissions, etc.). The simplified computing device of FIG. 15 may also include other optional components, such as, for example, one or more conventional computer output devices 1550 (e.g., display device(s) 1555, audio output devices, video output devices, devices for transmitting wired or wireless data transmissions, etc.). Note that typical communications interfaces 1530, input devices 1540, output devices 1550, and storage devices 1560 for general-purpose computers are well known to those skilled in the art, and will not be described in detail herein.

The simplified computing device of FIG. 15 may also include a variety of computer readable media. Computer readable media can be any available media that can be accessed by computer 1500 via storage devices 1560 and includes both volatile and nonvolatile media that is either removable 1570 and/or non-removable 1580, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Eventually Consistent Sharing Model described herein, or portions thereof, may be stored, received, transmitted, or read from any desired combination of computer or machine readable media or storage devices and communication media in the form of computer executable instructions or other data structures.

Finally, the Eventually Consistent Sharing Model described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Eventually Consistent Sharing Model has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Eventually Consistent Sharing Model. It is intended that the scope of the invention be limited not by this detailed description, but rather by the claims appended hereto.

What is claimed is:

1. A computer-implemented process, comprising using a computing device to perform process actions for:
    providing one or more fork-join models that represent a pre-defined conflict resolution policy, defined by a cloud data type, for updating a primary revision of data shared between a plurality of computing devices connected to a networking environment;
    maintaining the primary revision on one or more of the computing devices acting as a primary host, said primary revision representing a local revision held by the primary host;
    initiating one or more forks of the primary revision to one or more of the computing devices acting as any of clients and secondary hosts to create one or more nested levels of forked revisions, each forked revision stored as a local revision by the computing devices receiving those forked revisions;
    performing one or more update operations on any local revision to create corresponding updated local revisions; and
    providing eventually consistent transactions by joining one or more updated local revisions received by any particular host into the local revision of the particular host, and applying all update operations that were performed on the received updated local revisions, in the time between the fork of the primary revision to the corresponding computing device and the join of the corresponding updated local revision, to the local revision of the particular host in accordance with the conflict-resolution policy.

2. The computer-implemented process of claim 1 wherein one or more of the fork-join models are derived from a corresponding revision diagram of arbitrary depth.

3. The computer-implemented process of claim 1 wherein any client can disconnect from the networking environment at any time.

4. The computer-implemented process of claim 1 wherein any client can update its local revision at any time, whether or not it is currently connected to the networking environment.

5. The computer-implemented process of claim 1 wherein one or more of the clients perform the following case-based process actions:
    if the client updates its local revision and a new revision is not currently expected by the client from any host, sending a copy of that client's updated local revision to one or more of the hosts, and locally forking a new copy of the updated local revision for continued local use by the client;
    if the new revision has been received by the client from any host, using one or more of the fork-join models to join the local revision into the new revision received from the host to create a new local revision for that client; and if the new revision expected from any host is not currently available to the client, preventing that client from joining or forking its local revision, and for any copy of the client's local revision sent to one or more hosts, joining that copy to the primary revision in accordance with one or more of the fork-join models to update the primary revision maintained by the primary host.

6. The computer-implemented process of claim 1 wherein the pre-defined conflict resolution policy does not include a causally consistent partial order or timestamp evaluation.

7. The computer-implemented process of claim 1 wherein each fork-join model automatically determines both arbitration and visibility of updates to the shared data received by any computing device from any other computing device.

8. The computer-implemented process of claim 1 wherein the pre-defined conflict resolution policy is defined by any of a predefined and a user-defined cloud data type.

9. A system, comprising:
a general purpose computing device; and
a computer program comprising program modules executable by the computing device, wherein the computing device is directed by the program modules of the computer program to:
provide one or more fork-join models that use a conflict resolution policy, which does not include a causally consistent partial order or timestamp evaluation, for applying updates to a primary revision of data shared between a plurality of computing devices connected to a networking environment;
maintain the primary revision on one or more of the computing devices acting as a primary host, said primary revision representing a local revision held by the primary host;
initiate one or more forks of the primary revision to one or more computing devices acting as any of clients and secondary hosts to create one or more nested levels of forked revisions, each forked revision stored as a local revision on the computing devices receiving those forked revisions;
perform one or more update operations on any local revision to create corresponding updated local revisions; and
provide eventually consistent transactions by performing the following case-based actions while the data is being shared:
if the client updates its local revision and a new revision is not currently expected by the client from any host, sending a copy of that client's updated local revision to one or more of the hosts, and locally forking a new copy of the updated local revision for continued local use by the client,
if the new revision has been received by the client from any host, using one or more of the fork-join models to join the local revision into the new revision received from the host to create a new local revision for that client, and
if the new revision expected from any host is not currently available to the client, preventing that client from joining or forking its local revision, and for any copy of the client's local revision sent to one or more hosts, joining that copy to the primary revision in accordance with one or more of the fork-join models to update the primary revision maintained by the primary host.

10. The system of claim 9 wherein one or more of the fork-join models are derived from a corresponding revision diagram of arbitrary depth.

11. The system of claim 9 wherein any client can disconnect and subsequently reconnect to the networking environment at any time.

12. The system of claim 9 wherein any client can update its local revision at any time, whether or not it is currently connected to the networking environment.

13. The system of claim 11 wherein any client that previously disconnected from the networking environment will perform the case-based actions upon reconnection to the networking environment.

14. The system of claim 9 wherein each fork-join model automatically determines both arbitration and visibility of updates to the shared data.

15. A computer-readable storage hardware device having computer executable instructions stored therein, said instructions causing a computing device to execute a method comprising:
providing one or more fork-join models that provide a pre-defined conflict resolution policy, defined by a cloud data type, for applying updates to a primary revision of data shared between a plurality of computing devices connected to a networking environment;
maintaining a primary revision of the shared data on one or more of the computing devices acting as a primary host, said primary revision representing a local revision held by the primary host;
initiating one or more forks of the primary revision to one or more computing devices acting as any of clients and secondary hosts to create one or more nested levels of forked revisions, each forked revision stored as a local revision on the computing devices receiving those forked revisions;
performing one or more update operations on any local revision to create corresponding updated local revisions; and
providing eventually consistent transactions by joining one or more updated local revisions received by any particular host into the local revision of the particular host, and applying all update operations that were performed on the received updated local revisions, in the time between the fork of the primary revision to the corresponding computing device and the join of the corresponding updated local revision to the local revision of the particular host in accordance with the conflict-resolution policy.

16. The computer-readable storage hardware device of claim 15 wherein any client can disconnect from the networking environment at any time.

17. The computer-readable storage hardware device of claim 15 wherein any client can update its local revision at any time, whether or not it is currently connected to the networking environment.

18. The computer-readable storage hardware device of claim 16 wherein any client that previously disconnected from the networking environment will perform the following case-based actions upon reconnection to the networking environment:
if the client has updated its local revision and a new revision is not currently expected by the client from any host, sending a copy of that client's updated local revision to one or more of the hosts, and locally forking a new copy of the updated local revision for continued local use by the client,
if the new revision has been received by the client from any host, using one or more of the fork-join models to join the local revision into the new revision received from the host to create a new local revision for that client, and if the new revision expected from any host is not currently available to the client, preventing that client from joining or forking its local revision, and for any copy of the client's local revision sent to one or more hosts, joining that copy to the primary revision in accordance with one or more of the fork-join models to update the primary revision maintained by the primary host.

19. The computer-readable storage hardware device of claim 15 wherein each fork-join model automatically determines both arbitration and visibility of updates to the shared data.

20. The computer-readable storage hardware device of claim 15 wherein each revision diagram corresponds to a cloud data type.

\* \* \* \* \*